364-900 AU 237 $$$ EX

OR RE 26,919

01

June 23, 1970 D. W. HAGELBARGER ET AL Re. 26,919

INFORMATION STORAGE AND RETRIEVAL SYSTEM

Original Filed Aug. 21, 1962 14 Sheets-Sheet 1

INVENTORS D. W. HAGELBARGER
W. G. HALL
W. A. MALTHANER

BY Harry C. Hart
ATTORNEY

SYNC.
DRIVE
DRUM
COURSE INDEX
FINE INDEX #48
LAZ 46
LEH 47
LER 48
LEV 49
LIF 50
LERZ XXY
LESL XYX
LESSA XYY
LESSI YXX
LEST YXY
216
INDEX SELECTOR
231
239
DELAY ONE INDEX ITEM
LOC.
232
CODE SELECTOR
WORD
(683)
(662)
(673)
I<R → I≧R
I=R
I≦R → I>R
COMPARATOR
233
SYNC.
HORIZONTAL SWEEP GENERATOR
213
OPERATOR CONSOLE NO. N
203-N
OPERATOR CONSOLE NO. 2
203-2

INFORMATION STORAGE AND RETRIEVAL SYSTEM

Original Filed Aug. 21, 1962 14 Sheets-Sheet 11

United States Patent Office

Re. 26,919
Reissued June 23, 1970

26,919
INFORMATION STORAGE AND RETRIEVAL SYSTEM

David W. Hagelbarger and William G. Hall, Morris Township, Morris County, and William A. Malthaner, Colts Neck, N.J., assignors to Bell Telephone Laboratories, Incorporated, New York, N.Y., a corporation of New York Original No. 3,242,470, dated Mar. 22, 1966, Ser. No. 218,271, Aug. 21, 1962. Application for reissue Mar. 29, 1967, Ser. No. 637,030
Int. Cl. H04j *3/14*
U.S. Cl. 340—172.5 32 Claims

Matter enclosed in heavy brackets [ ] appears in the original patent but forms no part of this reissue specification; matter printed in italics indicates the additions made by reissue.

*ABSTRACT OF THE DISCLOSURE*

*An information retrieval system is disclosed wherein a plurality of operators obtain access on a time-sharing basis to a machine readable information storage file. To reduce the time required for searching through the file, indexing apparatus is provided whereby certain request information from the different operators is compared on a character-by-character basis with index information to identify the general location of the requested information in the file. If, for a specific request, this comparing operation cannot be completed because of insufficient request information, the indexing apparatus is released to other operators for use by them until the particular inquiry in question is more fully specified. When access is restored and upon receipt and comparison of sufficient request information, a block of entries specified by the comparison is read out from the file and transmitted to the requesting operator for display on a cathode ray viewing tube.*

*FIELD OF THE INVENTION*

This invention deals with the selective retrieval of desired units of information from mechanisms in which large amounts of such information are stored. Its principal objects are to provide rapid and positive access to the store, to share such access among a number of applicants for it, and to present to each applicant the information retrieved at his behest in convenient and immediately usable form.

*DESCRIPTION OF THE PRIOR ART*

For satisfactory retrieval of a desired item of information from any mechanized "library" the initial storage of such information must have been carried out according to some systematic plan; and the simpler the plan, the surer is the retrieval. Provided that the information is of a character to lend itself to such treatment, arrangement of the items of information in numerical or alphabetical order is an advantageous plan to adopt, in which case any desired information may be recovered by merely scanning through the store, item by item, until the desired one is found. On the other hand, if the library be a large one, its mere magnitude poses problems of a different kind. If it is of such great bulk that the capital investment in the store itself is very considerable, the time required to carry out such a scanning process may be prohibitive, especially if a number of "readers" ask for service at the same time; and still more so if their demands are urgent.

An illustrative situation in which a number of operators require frequent and ready access to a large store of information that is alphabetically arranged is found in the modern Telephone Information Bureau. In New York city at the present time each of a number of different bureaus is manned by some 90 "information operators," each of whom is provided with a library of telephone directories totaling 95 pounds in weight. While the efficiency of thees operators is high, the average time required to answer an inquiry is 36 seconds. Because of the ever greater number of subscribers to telephone service and their ever greater reliance on the information bureau, inquiries are received at the rate of some million per day. Obviously, the cost of maintaining such an operation is high and substantial economies would result from the installation of an automatic or semiautomatic information processing system.

*SUMMARY OF THE INVENTION*

Accordingly, it is a specific object of the invention to introduce automation into a telephone information bureau.

To this end the entire telephone directory is transcribed, in digital code form, onto a suitable retentive medium. Each name, with the corresponding address and telephone number, constitutes a single item of the stored information and these items are stored in an alphabetical or numerical order corresponding to that in which they appear in the printed directory. The entire set of items and the store containing it is termed the "main file." To minimize the time required for access to the main file, index sotres are provided; advantageously, one or more of the discs of the group are set aside for the purpose. Advantageously, too, the index is graded: coarse and fine; coarse, finer, finest; first order, second order, third order, fourth order, and so on to the extent dictated by the fineness of resolution required and the complexity of apparatus that can be tolerated. For simplicity of illustration, indices of two grades are provided. There is a first coarse index containing, for example, 200 words or partial words arranged alphabetically and numbered serially and there are, in addition, 200 fine indices each corresponding to a single entry of the coarse index and each, in turn, containing, for example, 50 longer words, similarly arranged, each accompanied by a numerical designation of the location, in the main file, at which the complete word appears.

The successive approaches by the control apparatus to the correct location in the main file are effected by successive interrogation of the indices with the name (or address) of the subscriber whose telephone number has been requested. The apparatus compares the inquiry, first with the successive items of the coarse index to identify a particular pair of fine indices and then, by comparison with the successive items of the selected fine indices to identify the word which most nearly resembles an item of the main file and to pick the location in the main file at which that item appears.

It is a feature of the invention that access to the main file is not sought until after this identification of the location in the main file has been successfully completed. It is another feature of the invention that the comparisons are made on a step-by-step basis, successful comparison with the coarse index leading at once to the identified fine index and successful comparison with that fine index leading at once to the desired location in the main file.

Once the correct location in the main file has been thus defined and picked, an entire block or batch of information items, each an entire entry in the telephone directory, is read out of the main file into a buffer or buffers for further processing. This read-out can take place in a small fraction of a second, whereupon the main store is released for acceptance of read-out instructions originating with other operators.

The block of entries read out at the behest of a particular operator is next translated, first, from binary code into the form of alphabetical and numerical or "alphanumeric" symbols and, then, from these symbols into "video" signal form suitable for application to a conventional cathode ray viewing tube. Each operator of the group is provided with one such viewing tube onto the screen of which the block of information read out from the main file in response to that operator's request, or a selected part of it, is presented in visually readable form.

As a refinement, in order to reduce eye strain and insure against errors of reading, only a fraction, for example, one eighth of the block of information read out of the main file is presented on the screen at one time and the selection of this fraction from the entire block is under the manual control of the operator who thus, figuratively, shifts a "window" over the block to expose a desired part of it. This is accomplished in the following way.

The video isgnal, into which the entire information block is convetred before application to the viewing tube, is stored on a spiral track of one of the discs of the set. Because the video signal is highly redundant as compared with the compact character of the coded information in the main file, the information block in its video form occupies several turns of the spiral track. The width of this track is determined by the magnetic transducer with which it is recorded on the face of the disc. In accordance with the invention, the width of the read-out transducer or "head" is only a fraction, one fourth or one fifth, of the width of the recording transducer. Thus, the part of the record recovered by the read-out head lies entirely within a single turn of the spiral throughout three fourths or four fifths of a revolution of the disc which bears it. By adjustment of the radius, measured from the center of the shaft, at which the read-out head is located, and coordinated adjustment of the switching operations by which it is activated and deactivated, it cyclically and repeatedly reads out the video information stored at a particular part of this track, being de-energized during the one fourth or one fifth of disc revolution in which the spiral line which separates each turn of the spiral track from its neighbor passes under the read-out head. Both the radial location of the read-out head and the switching times are together controlled by the operator seeking the information. Simultaneously and in response to the same control by the operator, the instant, during each scanning cycle of the viewing tube, at which the vertical sweep of the scanning beam commences is also determined. The result of this three-way control by the operator is to present the operator's eyes a short list of some 10–20 items, each consisting of a name, an address and a telephone number, and appearing brightly in letters and numerals that may be one eighth-one fourth inch high. In case the item sought for does not appear in this list, the alphabetical arrangement of the list immediately informs the operator whether the desired item lies above the window or below it, in which case a further manipulation of the manual control in the proper direction brings it immediately into view.

The mechanism by which comparison is made between a specified item and the coarse and fine indices may take various forms. In one form the operator commences to "type" the name (or address) of the party whose telephone number is requested on a keyboard instrument which delivers, for each key depressed, the corresponding binary digital code. As the symbols are "typed," they are stored in a register and, character by character and commencing immediately the first character has been registered, the item or partial item, thus registered is compared on a numerical basis with all of the words of the coarse index. These may advantageously be stored in a single circular track of one of the discs and the comparison can be completed in a single disc revolution, i.e., in $\frac{1}{30}$ second. A counter determines how many of the partial words in the coarse index are identical with the partial item stored to date in the register. Evidently, the smaller the number of characters registered, the greater the number of partial words in the coarse index that resemble it. Hence the count of identities starts with a large number and is successively reduced as the "typing" progresses. When the count indicates that the coarse index contains only one partial word that is identical with the partially typed inquiry, or none at all, switching operations are initiated which select a particular pair of fine index tracks identified by the number of the word in the coarse index thus picked; one lying just ahead of the coarse index word thus picked and the other just after it. From now on the comparison is made as before between the partial item as typed to date and the consecutive words of the two fine indices, the count of identities becoming progressively smaller. As before, when the count indicates only one identity, or none at all, similar switching operations are initiated which, this time, select a location in the main file; i.e., a particular disc of the set, one or the other of two sides of this disc, one of some 800 adjacent circular record tracks on this disc side and a sector of this track at which the code counterpart of the initial entry of the desired information block is stored. Read-out and presentation to the operator then take place as described above.

To insure that the information item required shall in fact be contained among the information items thus extracted from the main file, the extraction commences with a block of fifty items immediately preceding the point at which it is established that there is at least one identity or that there are no identities. In the case of an identity count of zero, the required item must be contained in this first block of fifty items and it is therefore arranged that the extraction shall go no further. In case a single identity has been encountered, the required item may be among the fifty items preceding the identity or among the fifty items which follow it and it is therefore arranged that the extraction continue through a second block of fifty items. In addition, and to cope with situations in which all of the information available in the operator has been registered and extraction is required despite the fact that it is still insufficient to define a location in the main file to a precision of one item in a hundred, provision is made to extract a still larger string of items, i.e., three, four or five sequential blocks of fifty. This exceptional extraction is initiated by a special signal, while the number of sequential blocks of fifty so extracted is automatically determined by the number of identities counted.

As a consequence of the character-by-character comparisons, full specification of the desired location in the main file may well have been achieved before the specification of the inquiry is complete, especially in the case of the less common names. This makes for a substantial economy of the total time required for processing an inquiry. Furthermore each interrogation of an index, coarse or fine, which does not identify a particular one of the index words causes immediate release of the access mechanism to other operators for use by them pending the time at which the particular inquiry shall have been more fully specified by the addition of one or more characters. Thereupon, access is restored to the particular operator for a further attempt.

It is another feature of this character-by-character registration of the inquiry, that, when access is restored to an operator who is in the course of building up the specification of an inquiry, the outcome of comparisons previously made is retained so that they need not be repeated.

In an alternative embodiment which utilizes no keyed codewriter and relieves the operator of the typing burden. the coarse alphabet is initially displayed on the screen of the operator's viewing tube. For this purpose it may be stored as a video signal for direct application to the viewing tube. The operator is provided with a stylus equipped with a photocell in its tip. The operator merely touches the viewing screen at the point bearing the partial word of the course index which most nearly resembles the name for which inquiry has been made. As the cathode beam passes this point, the output signal of the photocell marks the fractional time, within the scanning cycle at which this occurs, thus identifying the line of characters constituting the selected partial word. This registered time acts to select a particular one of the 100 or so fine indices which, along with its fellows, has been stored in the same form as the coarse index, and to present it in its entirety on the screen of the viewing tube. Again, the operator merely touches the screen with the photosensitive stylus at the point bearing the name most nearly resembling the name for which inquiry has been made. As before, this acts to register the time, within the scanning cycle, at which the cathode beam passes this point, and the time thus registered identifies a location in the main file at which the required information block is recorded. Read-out and presentation take place as before.

Because of the rapidity with which each of the foregoing operations takes place, a large number of them, like or unlike, and originating with different operators, can take place on a time-division basis within a brief time interval. Thus all the apparatus components of the system, with the exception of a few that must of necessity be individual to the operator are shared by a number of operators.

The invention will be fully apprehended from the following detailed description of an illustrative embodiment taken in connection with the appended drawings.

*BRIEF DESCRIPTION OF THE DRAWINGS*

In the drawings, all components shown in the various portions of FIG. 1 are assigned reference characters in series 101–199; all those shown in FIGS. 2A–2E are assigned reference characters in the series 201–299 and so on. The first digit of any reference character thus guides the reader to the principal figure in which it is shown. In many cases the same component is also shown in another figure where it is identified by another reference numeral, of which the last two digits are the same. Especially in the case of input conductors and output conductors which are common to two or more figures, a reference character is in certain cases shown in one figure in parentheses. This reference character, by virtue of its position in the number series, guides the reader to another figure in which it also appears.

In the drawings.

The following table of contents will be of assistance to the reader in his perusal of the detailed description which ensues.

Detailed Description

TABLE OF CONTENTS

| | Column |
|---|---|
| Outline | 6 |
| The main file | 7 |
| Read-out | 8 |
| Digital buffer and frequency standardization | 8 |
| Code translation and symbol generation | 9 |
| Conversion to video signal and display | 9 |
| The video store | 10 |
| Window control | 11 |
| Indices of main file and access mechanism—First embodiment | 13 |
| The word comparator | 18 |
| Individual operator's location registers | 22 |
| Clearing of registers | 23 |
| Indices of main file and access mechanism—Second embodiment | 24 |
| The address file and its uses | 25 |
| Numbers most frequently and least frequently called for | 26 |
| Emergeny lists | 27 |
| Design and updating of indices | 28 |
| Interlacing; parallel processing | 30 |

Outline

Figure 1:
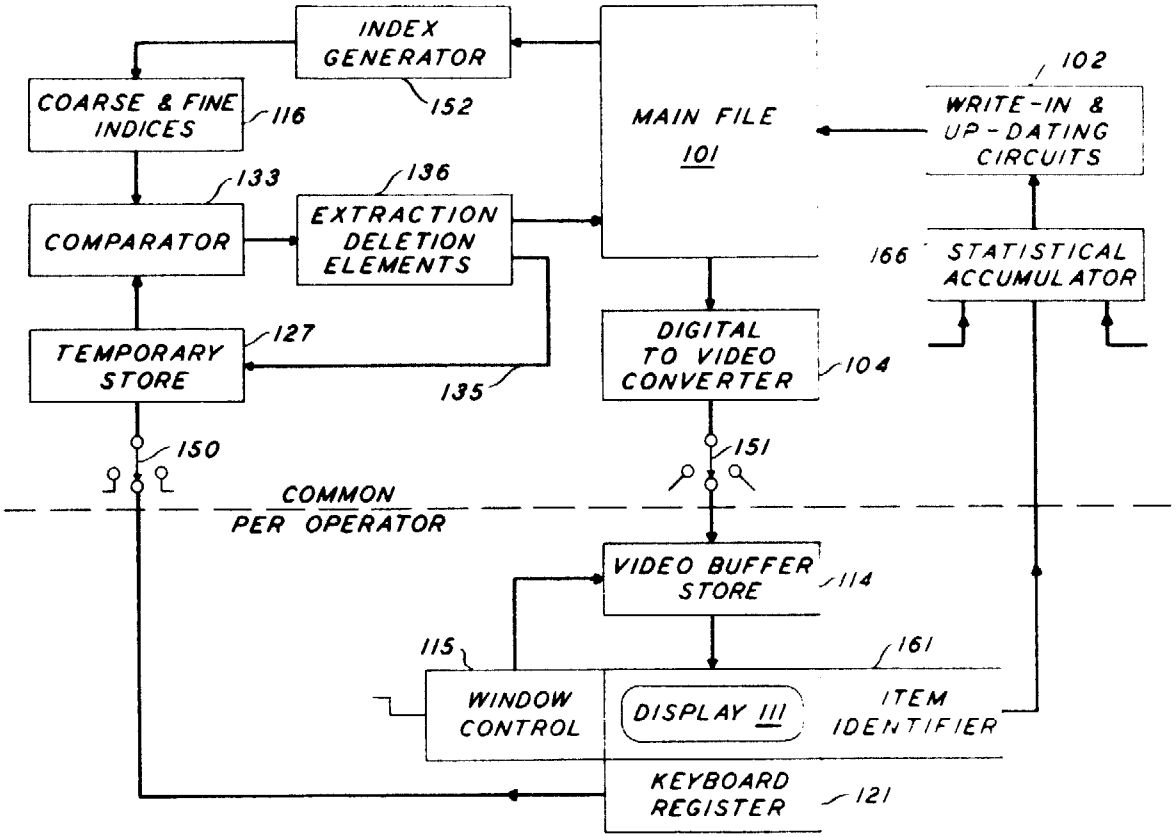
FIG. 1 is a block diagram showing the major features of an embodiment of the invention in broad outline.

Referring now to the drawings, FIG. 1 shows the major features of one embodiment of the invention in broad outline. The heart of the system is the man file 101 which, along with other apparatus components shown in the upper part of the figure, is accessible in common, and on a time-division basis, to a number of individual operators. The apparatus individual to one of such operators is shown in the lower prt of the figure. Switches 150, 151 indicate accessibility to other operators.

The main file 101 contains, in binary code form, all of the thousands of information items of which a telephone directory is composed. Each item consists of a subscriber's name, his address, and his telephone number. The individual items are systematically arranged: in alphabetical order of names, in numerical order of addresses, or both. Each item is stored at a specific location; since the item occupies space, the location is that of the first character of the item. Insertion of the items is accomplished by well known means, here indicated, simply, write-in and updating circuits 102.

With a costly main file, access time is at a premium. Hence searching the main file to locate a desired item is to be avoided. Instead, an index 116, preferably graded into at least two "layers," is provided, through which, in response to interrogation by an operator, the location in the main file is determined at which a block of items containing the desired one commences. Thereupon the entire block is read out of the main file, processed, decoded, and converted by apparatus 104 broadly designated as serving these purposes. The resulting video signal is stored, for cyclic read-out and display, in the individual operator's video buffer store 114. The display takes place on the screen of the operator's individual viewing tube 111 and the items displayed comprise a subblock of a conveniently smaller number of items. By manipulation of a window control unit 115 the operator rapidly causes this subblock of items to progress, forward or backward, through the entire block read out, until the desired item appears among those of the subblock displayed.

The operator may then read the item and answer the inquiry. As a refinement, the operator may also be an action of the simplest kind, and with the air of an item identifier 161, identify the particular item sought. Such identifications, originating with all the operators of the group, are gathered by a statistical accumulator 166, and this controls the write-in circuits 102, to inject into the main file, and adjacent each item requested, a "marginal note" signifying the fact of the request. From such data lists can be constructed of items that are inquired for with exceptionally high, or low, frequency.

To obtain access the operator, by typing the name of the subscriber on a keyboard, inserts this name, character by character, and in binary code, in a register 121. Each time a new character is thus registered, the partial name consisting of the characters registered to date is transferred to a temporary store 127, and the partial word in the store is consecutively matched by a comparator 133 against the binary coded words of the index 116. Initially, the comparison is with the words of a coarse index that ranges through the entire alphabet, to identify the most nearly similar index word and so to make a selection from a number of fine indices. If the coarse comparison is successful, as determined by a decision element 136, a fine index is selected, and the character-by-character comparison proceeds as before for the later characters registered, to identify the main file location of the block of items appropriate for extraction.

To the contrary if, at any stage of the matching process, the registered word is insufficiently well defined to justify proceeding to the next step, the decision element 136, by a control path 135, clears the temporary store 127 and releases the access-obtaining apparatus to another operator who may in the interim have registered the name of another subscriber as to whom information is sought, with sufficient particularity to justify proceeding.

All of these operations take place on a rapid fire basis: thirty independent index comparisons can be made in a second of time. Hence an operator who, after some initial matching failures, may have registered a name with sufficient particularity to make for success, is unaware of the many intervening comparisons with names registered by other operators.

For efficient operation of the system the index or indices must be well designed and well constructed. Moreover, as the information in the main file 101 changes from day to day, the indices 116 must from time to time be regenerated. The invention provides an index generator 152, fully described below, which insures congruence between main file and index and, at the same time, excludes from the index all information not actually helpful.

The main file

In the main file 101, each entry may be standardized at fifty characters of which the normal telephone number occupies seven, and the normal address occupies from six to twelve, leaving some thirty characters, which is ample, for the name and for spaces of various lengths. For the sake of the certainty of operation which it provides, storage is in the form of binary code. One or more binary digits or "bits" out of a possible 6 can be arranged in 64 different ways. Accordingly, a 6-bit code provides for the coding of 64 different symbols; i.e., more than enough for all the letters of the alphabet, the Arabic numerals 0 through 9, spaces of various lengths, punctuation marks and, if desired, a few signaling symbols.

Because of the readiness with which new entries may be inserted in the file and old ones altered or erased, magnetic storage is preferred. For the sake of compactness, the store may take the form of a set of discs, each magnetizable on both sides, mounted on a common rotary shaft. A set of 24 such discs, each 39 inches in diameter, and bearing on each side a magnetizable band 12 inches in width, each provided with several transducers mounted on a radially movable arm for write-in and read-out, is manufactured and sold by Bryant Computer Products Division, Ex-Cell-O Corporation. A single such set is sufficient for a community such as Atlanta, Georgia. A store three times as large, conveniently three sets of such discs, would be required for a city of the size of New York City.

The fineness of the magnetic surface is such that individual circular record tracks may be spaced apart radially by less than 0.02 inch, and the bits may be packed to a density of better than 250 to the linear inch of track. Because more bits can be packed into an outer track than into an inner one, the sensitive surface may advantageously be divided into 6 annular zones, each 2 inches in width and containing 128 tracks. Fixed timing marks may be placed in the spaces between zones, each governing the bit packing in an adjacent zone. Information may be written into any track of any disc by conventional apparatus, here designated as "write-in and updating circuits" 102. For optimum utilization of storage space the write-in operation may be conducted at the appropriate one of six different frequencies spaced apart on the freguency scale in direct proportion to the mean radius of the zone containing the track in which the information is to be written. The entire assembly is rotated at a speed of 30 revolutions per second by a main drive.

Read-out

Figures 2A, 2B, 2C, 2D, 2E, 3:
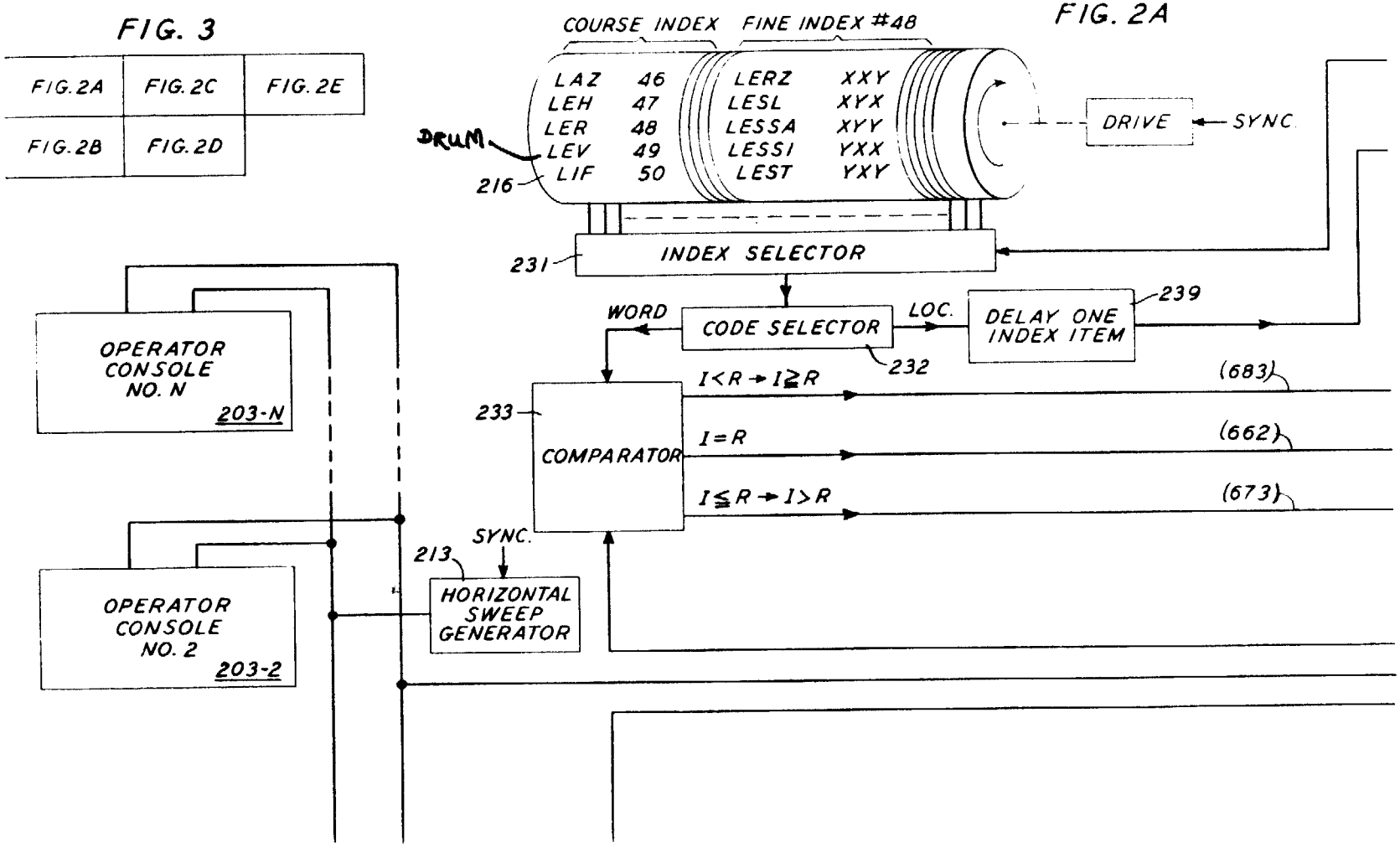
FIGS. 2A, 2B . . . 2E, arranged as shown in FIG. 3, together constitute a block schematic diagram showing apparatus embodying the invention.
Figure 2B:
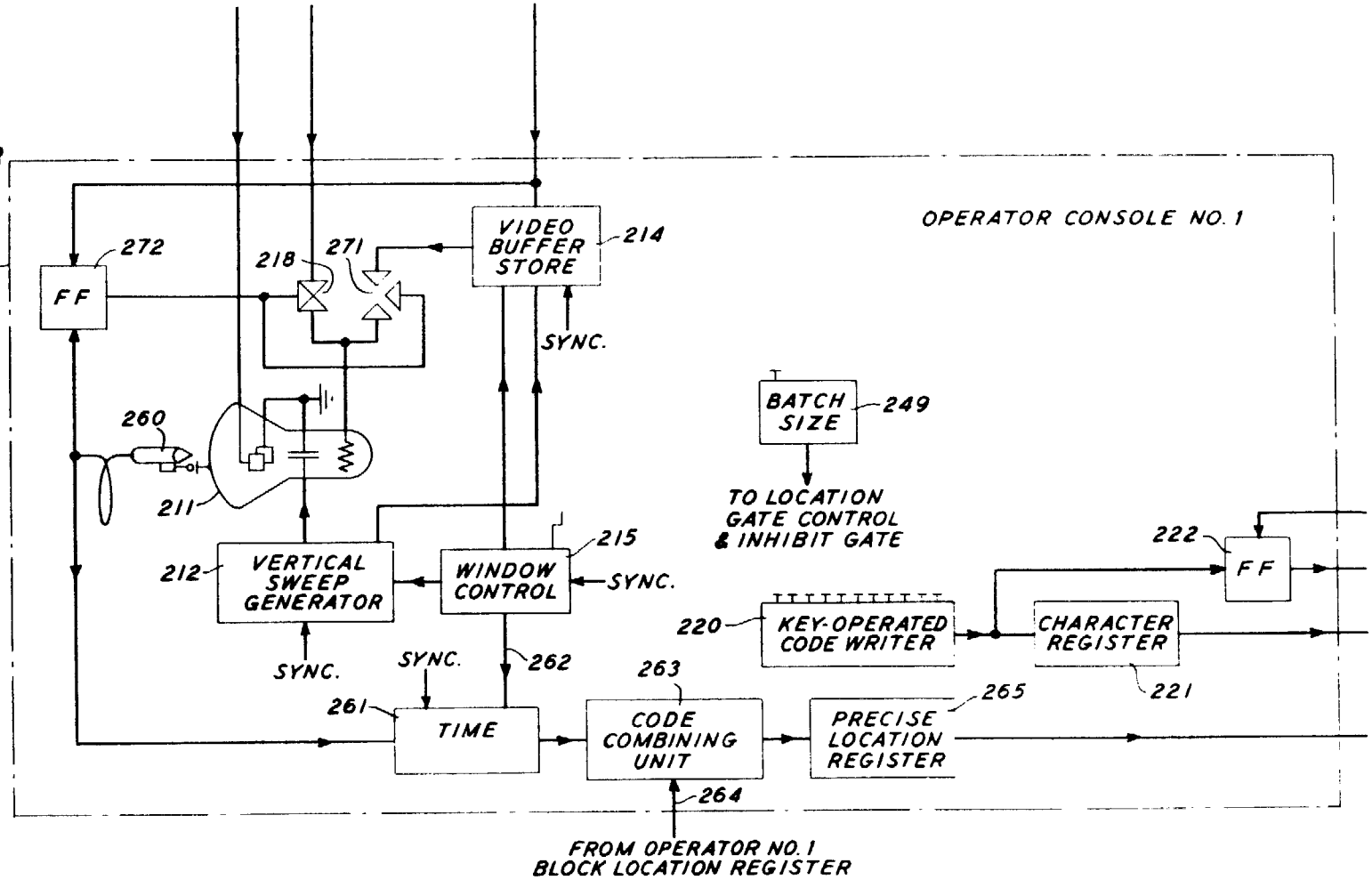
Figure 2C:
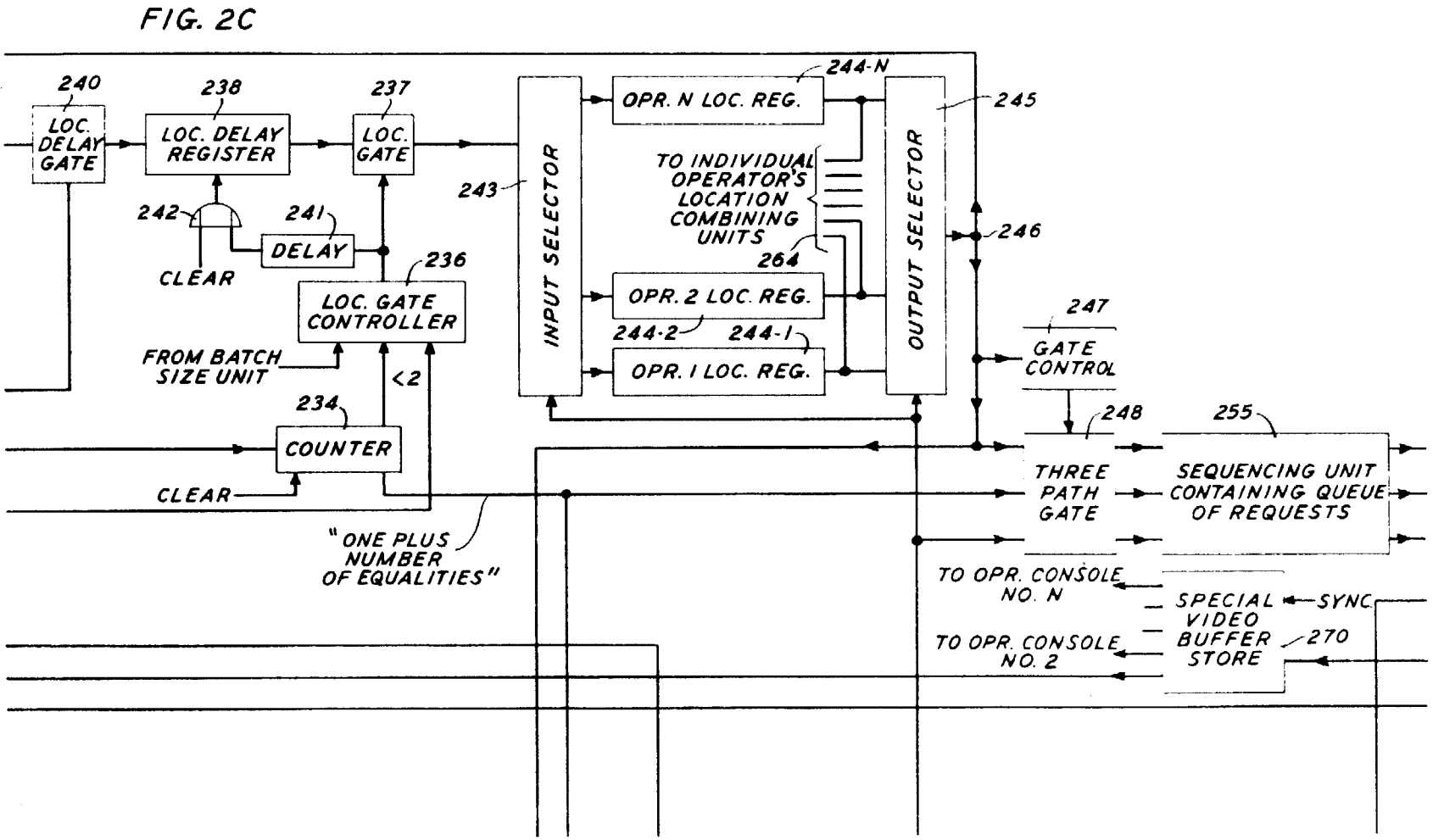
Figure 2D:
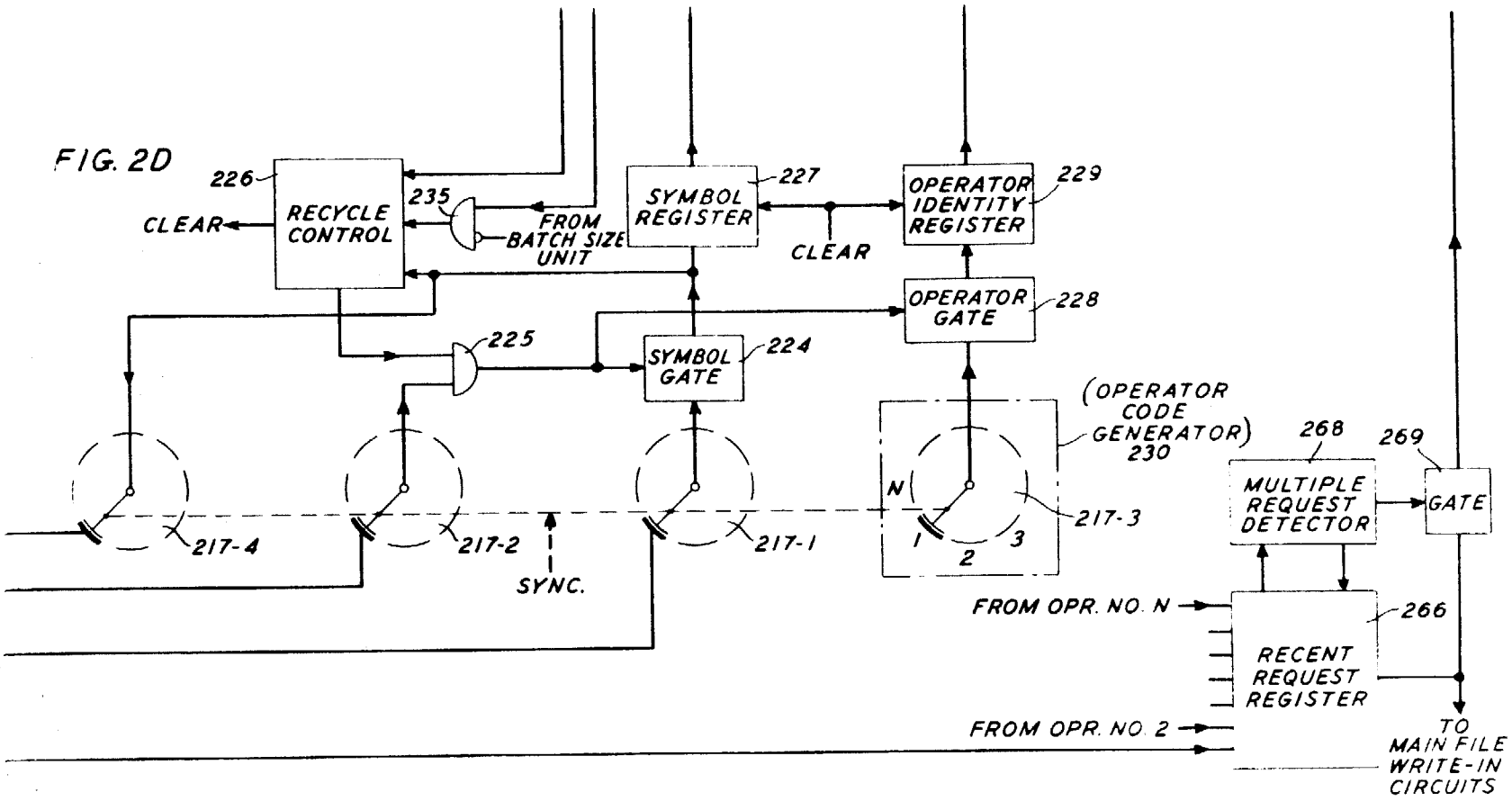
Figure 2E:
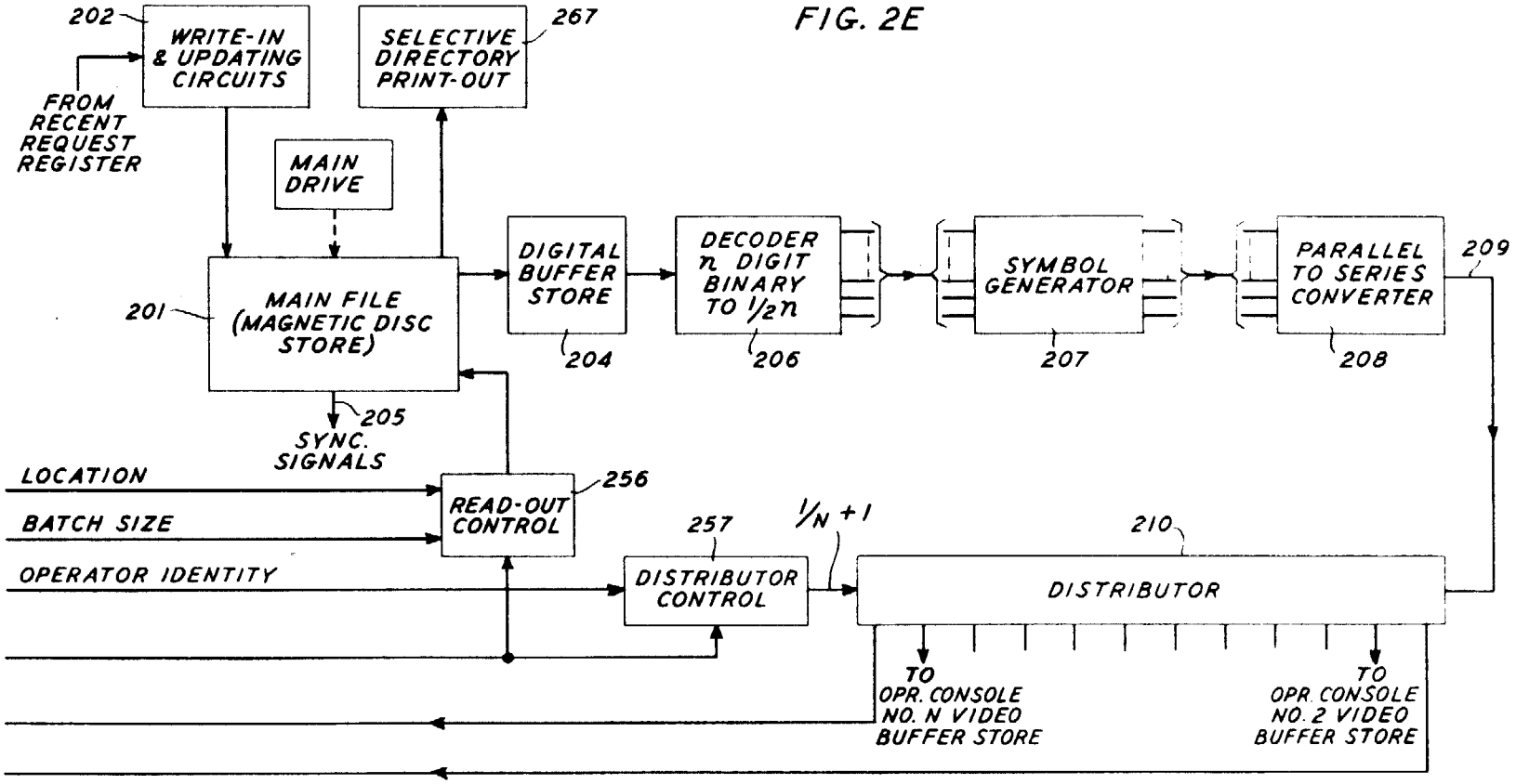

The procedure for obtaining access to the main file at a desired location and the apparatus by which it is instrumented will be best understood in the context of the entire system as shown in FIGS. 2A . . . 2E, arranged as shown in FIG. 3. For this reason the description of the access-obtaining parts of the apparatus will be postponed until after the remainder of the system has been described in broad outline.

Assume that one of a number of operators, whose individual consoles 203–1 through 203–N are shown as indicated at the left-hand portion of FIG. 2B has, in answer to an inquiry, sought and obtained access to the main file 201 (FIG. 2E) at the location at which a block of entries embracing the one sought for is recorded. The entire block is read out by conventional means in the course of a few revolutions of the discs of which the main file is composed and, in most cases, in the course of a single revolution.

Digital buffer and frequency standardization

To facilitate further processing and, in particular, in order that the processing bit rates for the several bits of each single entry may be alike, it is advantageous that their magnetic records be placed, in the main file 201 at identical radii from the central shaft. To secure this result the six bits of each entry will have been recorded on six different tracks on six different disc sides. The bit frequency of the read-out differs from each such group of six tracks of the main file 201 to the next. The six magnetic records of a single entry are first read out as six parallel streams of pulses, at a speed dependent on the radius at which they appear, into a digital buffer store 204 (FIG. 2E) into which they are written, at the same speed, on six contiguous tracks of a single disc, one or more discs of the set having been reserved for the purpose. Frequencies may then be standardized in well known fashion, i.e., by writing each stream of pulses thus recorded in one part of the buffer 204 into a shift register without speed change and then reading the pulses out of the shift registers and writing them into another portion of the buffer 204 under the control of a "clock"; i.e., at a standard frequency, and with a standard spacing between each item and the next. "Clock" pulses for the purpose may conveniently be permanent marks on one of the discs so as to recur in the exact synchronism with the shaft rotation. The terminal 205 of the main file 201 carries synchronizing signals for this and many other purposes.

In most cases, a block of one hundred consecutive entries will more than suffice, and these can be written into six single-turn tracks of the discs of the buffer store 204. Under some circumstances, a larger block, e.g., a block of 200–300 consecutive entries, may be needed. These will require several sets of six-track groups, and additional switching, not shown but of a type well known, can be provided to start the write-in of the second set when the tracks of the first set have been filled.

Code translation and symbol generation

The block of entries now in the digital buffer store 204 is still in the form of 6-bit code. The code for each symbol is now translated by a decoder 206 into the specification of a single one out of $2^n$, in this case $2^6=64$, possible conductors. The conductors of this set are connected to the several input points of a symbol generator 207 which, in turn, converts the specification of this conductor into signals representative of alphanumeric symbols, one for each code group of six bits. This symbol generator may take various forms, among them a rectangular array of magnetizable cores arranged in rows and columns, e.g., eight rows and seven columns, and threaded by wires of three kinds: row wires, column wires and a symbol wire. Core arrays of this type are utilized as character generators in Gordon et al. Patent 2,920,312 and in W. J. Rueger Patent No. 2,820,956. The symbol generation may be carried out in various ways, of which that employed by Rueger is preferred; i.e., the symbol wire which threads only those cores of the array that are arranged in the pattern of a specified symbol constitutes the input terminal of the symbol generator and is connected, as indicated in FIG. 2E, to a corresponding one of the $2^n$ output conductors of the decoder. Read-out takes place, in response to the application of pulses derived in well known fashion from fixed marks on one of the discs to the column conductors in sequence, from all the row conductors simultaneously. This response consists, on each such row conductor, of one or more pulses, or none at all, one for each of the cores through which all three wires are threaded.

Conversion to video signal, and display

The pulses on the several row conductors of the symbol generator 207 are now applied to a parallel-to-series converter 208 whose function is to rearrange them into video signal form. The converter 208 may be a delay line having a plurality of lateral taps, to which the individual row conductors are connected, and a single output terminal 209 at which the resulting video signal is developed. Equally well, it can be a part of one of the circular tracks on a disc, with which is aligned a single read-out head and a number of write-in heads, all spaced apart to provide the required differential retardations. This video signal is selectively passed by a distributor 210 to the console 203–1 assigned to the operator requesting it for ultimate display on the viewing screen of the cathode ray tube 211 that forms part of that operator's console (FIG. 2B). This tube may be of conventional construction and may be actuated in accordance with a conventional scanning program, i.e., 30 vertical sweeps per second developed by a generator 212 each containing some 200–300 horizontal sweeps developed by a generator 213 (FIG. 2A).

The horizontal sweep generator 213 is common to the display tubes 211 of all of the consoles 203 and hence causes the horizontal sweeps of the beams of all of these tubes to move in synchronism and in phase coincidence. Its operations are controlled by synchronizing signals derived from the terminal 205 of the main file 201 (FIG. 2E) so that the horizontal sweeps are not only synchronous with each other but are also in synchronism and in a fixed phase relation with the rotation of the discs of the main file and of hte digital buffer store.

The vertical sweeps of the beams of the several viewing tubes 211 (FIG. 2B) also take place synchronously with the rotation of the discs but, for reasons that will appear below, the phase relation between disc rotation and vertical sweep is advantageously controllable, for each of the viewing tubes 211, by the operator to whom it is assigned. Hence each console is provided with its own vertical sweep generator 212. The frequency at which each one operates is under control of synchronizing signals derived from the main file terminal 205 but the phase of its output wave, and hence of the vertical sweep, is individually controlled in the fashion to be described below.

To build up a visible display of the symbols represented by the video signal on the viewing screen requires that the uppermost portions of all of the symbols of a single 50 character entry, represented by the video signal derived from the top row conductor of the core array of the symbol generator 207 (FIG. 2E) be generated on one horizontal scan while the next lower portions, represented by the signals from the second row conductor of the core array, be generated on the following horizontal scan. Hence the delay interposed by the parallel-to-series converter 208 (FIG. 2E) between each of its input taps or write-in heads and the next is equal to the time occupied by a single horizontal scan. This period is evidently equal to the reciprocal of the number of scans per second, namely, 6000–9000, and the time required to build up an entire information item on the screen of the veiwing tube is eight times as long. It is to provide time in which this buildup can take place that, following the initial read-out from the main file into the buffer store, the shift register was called upon to standardize the spacing among entries.

Immediately read-out from the core array of the symbol generator 207 has taken place for the first symbol, it is desirable that the array be released for the generation of the next symbol. Provided the information thus read out is not lost track of, the release may readily be effected in conventional fashion, if necessary, by the application of reset pulses to the row wires.

The video store

To preserve the information thus read out in video form for application to the operator's viewing tube 211, it is first forwarded by the distributor 210 (FIG. 2E) to the particular operator requesting it and then placed in that operator's video buffer store 214 (FIG. 2B) for cyclic read-out. To simplify or avoid problems of synchronization, this video store, together with those assigned to other operators, may advantageously be constituted of one or more discs of the set, on the same shaft as the main file and the digital buffer store and rotated synchronously with them. However, because of the high redundancy that characterizes a video signal, a block of 50 to 100 entries, in video signal form, would occupy several full circular tracks. To prevent discontinuities and to provide further advantageous results that will be recognized from what follows, the video store is constituted of a spiral track. At normal rates and with normal packing densities, a block of 50 entries may occupy from 3 to 5 full turns of such a spiral while a block of 250 such entries may occupy 17–25 turns. Accordingly, the video signal output of the parallel-to-series converter 208 is applied to a transducer that is advanced by a lead screw juxtaposed with the sensitive face of the disc that is set aside to serve as the video store and the lead screw pitch and rotation speed are selected to cause the transducer head to advance radially, in the course of the rotation of the disc, thus to record the video signal along a spiral track.

Figure 4:
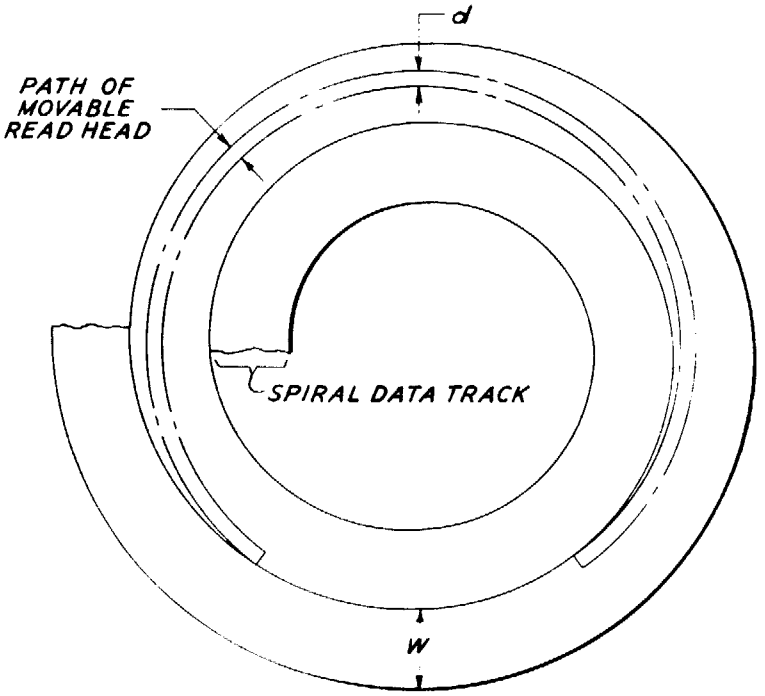
FIG. 4 is an outline diagram showing a spiral record track of substantial width and a portion of a single turn of the spiral to which a transducer of substantially less width responds.

FIG. 4 shows a portion of such a spiral track record. The width W of this track is several times as great as that of any of the circular tracks of the main file 201, and a fixed read-out head of width *d* that is only one fifth as wide as the track can still operate to read the information out of the track in unambiguous fashion. As the disc bearing the stored video signal on its spiral track rotates, the narrow read-out head lies entirely within a single turn of the spiral throughout ⅘ of a revolution. Given that the read-out head is actuated throughout this period in which track boundaries do not cross it and deactivated throughout the remaining fraction of each revolution of the disc, the video signal that is thus read out, cyclically and at 30 times per second, is constituted of only a portion of the entire information block written into it from the main file store; i.e., if the block occupies 7 turns of the spiral track, the fraction thus cyclically read out, in the case of a read-out head of 1/5, the track width, is $$\frac{4}{5} \times \frac{1}{7}$$

or about 12% and, the greater the number of spiral turns occupied by the block, the smaller the fraction thus cyclically read out. The video signal thus cyclically read out acts to establish a path through a switch 218 (FIG. 2B), theretofore open, and is then applied through this switch to modulate the intensity of the cathode beam of the viewing tube 211, i.e., to turn the beam on and off, the beam having theretofore been blanked. Since, as indicated by the application to the horizontal sweep generator 213 (FIG. 2A) of synchronizing signals derived from the central timing source, e.g., from the terminal 205, horizontal scanning of the beam across the face of the viewing tube takes place in synchronism and in phase with other operations of the system, notably the rotations of all the discs, the characters thus built up on the tube face in the course of the scanning operarion are correctly located laterally, i.e., the first letter of each surname of a telephone subscriber appears at the left-hand margin of the viewing screen.

Window control

A block of a few hundred—indeed a block of fifty—consecutive items that may have been read out from the main file is a large number for visual inspection without excessive eye fatigue. The much smaller number of entries cyclically read out of the video store 214 is quite otherwise. Individual symbols may be one-quarter inch high and spaced apart in the vertical dimension by another quarter inch, and each single group of fifty characters constituting an entry may extend from side to side of the viewing screen. This greatly facilitates visual selection by the operator of a single one of such entries thus presented to the eyes.

With video signals derived from magnetic cores in a rectangular array of seven columns and eight rows of which the symbol generator 207 is composed, the display on the screen of the viewing tube 211 is constituted of eight sequential horizontal scans for each character and hence for each index word or information item. To provide a character height of one quarter inch and a vertical spacing between entries of another quarter inch requires only that the adjacent horizontal scans be 1/32 inch apart and that each group of eight be separated from the next by an abrupt vertical displacement of one quarter inch. The active sloping portion of the wave delivered by the vertical sweep generator 212 should therefore be broken by abrupt rises at the proper points. Means are well known for generating a wave of this character.

Because of the restriction of the sublist of entries thus presented on the viewing screen to a fraction of the block read out, the individual entry sought for may not be among the items of this sublist. But because of the alphabetical or numerical ordering of the items in the main file 201 and consequently in the video store 215, the operator can easily recognize at a glance whether the individual item sought for precedes the sublist presented or follows it. The operator thus knows what is called for to bring it into view; i.e., if the item sought for precedes the list presented, to move the list downward across the face of thetube or, if the item sought for follows the list presented, to move the list upward.

To accomplish this movement the operator is provided with a manual window control unit 215 of which the instrumentation will be described in further detail below. In response to a single, simple manual operation, this window control unit does three things:

(a) By rotating a lead screw it moves the read-out head of the video store 214 radially inward or outward.

(b) It alters the instants in the rotation cycles of the disc at which the read-out head is activated and deactivated, retaining the duty cycle of four fifths.

(c) It trips the vertical sweep generator 212, which controls the vertical movements of the cathode beam so that each vertical sweep commences at the instant at which the read-out head lies entirely within one turn of the spiral track (FIG. 4) and continues until it is about to leave that turn and pick up information from the adjacent turn.

In consequence, the operator's manipulation of this control unit 215 causes the list of entries presented to the eyes to move upward or downward across the viewing screen as called for by the direction of the movement. Even an inexperienced operator provided with this arrangement can, in a short time, shift the sublist of displayed items vertically across the viewing screen until the individual item sought for appears among them. It is to be noted that it need only appear, and need not be centered. Hence, exactitude is not called for in the operation.

Figure 5:
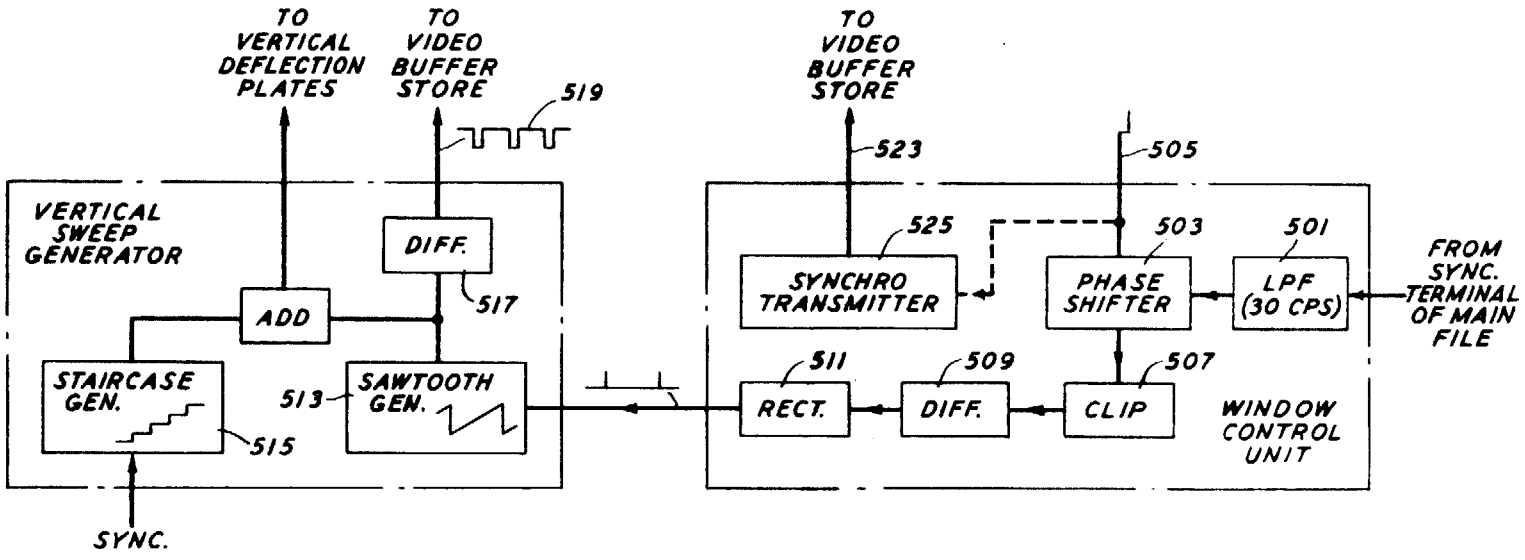
FIG. 5 is a block schematic diagram showing vertical sweep and window-control apparatus for selectively locating the transducer-actuating portion of the spiral track of FIG. 4.

FIG. 5 illustrates one of many alternative arrangements for the instrumentation of the operator's window control unit 215. A train of pulses of fixed frequency and standard reference phase derived, for example, from a fixed mark located on one of the rotating discs of the main file 201, is converted into a sine wave of the same frequency and phase by a low-pass filter 501 tuned to 30 cycles per second. A manually adjustable phase shifter 503, operated by a manual crank 505, or an equivalent lever, shifts the phase of this sine wave to any desired extent. The output wave is converted by conventional apparatus combination of clipper 507, differentiator 509 and rectifier 511 into a train of unipolar pulses each of which acts to trip a sawtooth wave generator 513, causing it to commence its sweep. The generator 513 may be proportioned, in conventional fashion, to develop a sawtooth wave of which the voltage rises linearly with time to a certain point and then falls more abruptly. This is additively combined with a staircase wave developed by a generator 515 that operates in synchronism with the horizontal sweep generator 213 to develop the required composite wave of vertical risers and sloping steps. Successive cycles of this composite wave are applied to the vertical deflection elements of the operators' cathode ray viewing tube 211, thus to control the vertical scan of the cathode beam. The rising portions of the wave control the scan during the display while the falling portions govern the vertical "flyback" of the beam.

The sawtooth wave thus developed by the generator 513 is passed through a differentiator 517 which converts it into a square wave 519 of which the positive portions endure for 4/5 of each cycle while the negative portions endure for 1/5. The square wave is transmitted to the video buffer store, there to enable a conduction path extending from the read-out head juxtaposed with the spiral track (FIG. 4) of the video store 214 to the control electrode of the viewing tube 211, the positive portions of the wave serving to establish the path while the negative portions disestablish it. Thus the passage of signals from the head is fully coordinated in frequency and in phase with the vertical sweep of the cathode beam of the tube 211.

The manual control 505 which actuates the adjustable phase shifter 503 acts, e.g., through a synchro-transmission link of which the transmitter 525 and electrical transmission path 523 are shown, and of which the receiver is located physically with the video store 214, to rotate a lead screw that carries the read-out head. A gear box, not shown may be interposed to coordinate the rotation angle of the lead screw, which of course depends upon its pitch, with the phase shift introduced by the phase shifter 503.

Indices of main file and access mechanism—First embodiment

It is a feature of the use of a plurality of discs for the main file, each with readout heads arranged on a supporting arm, and movable over a sufficient distance, that none of the circular tracks in which the information items are stored is ever distant by more than two inches from the nearest read-out head. By actuation of the head-supporting arms on command, the nearest head can be brought into juxtoposition with the desired circular track in a fraction of a second, whereupon the portion of this track containing the desired block of information passes under the head in less than 1/30 second. Consequently, once the location of the desired information block is defined it can be reached with great rapidity.

To take the fullest advantage of this feature, it is important that the read-out command not be given until the location has been defined with precision such as to insure that the desired item shall be embraced within the block read-out. Also, for the sake of economy, it is important that a large number of operators, acting independently, shall have common access to the information stored in the main file. The heart of the location-defining portion of the system is a set of stored indices: a single coarse index of partial words, arranged alphabetically and numbered in order, and a number of fine indices that are similarly arranged. For ease of illustration the indices are shown in FIG. 2A as stored on tracks on the surface of a drum 216. As a matter of fact the indices can be, and preferably are, stored on one disc of the set of 24 discs, set aside for the purpose. The constituent parts of the control mechanism will be described in the order in which their operations take place.

The central component of the common access mechanism is a multistage distributor 217 (FIG. 2D). While, as a practical matter, it will usually be preferred to empoly electronic apparatus, for clarity of illustration each of the four principal stages of the distributor is shown as consisting of a group of conductors arranged in a circle to each of which a mechanically rotatable pickup arm is capacitively coupled in turn. Some of these stages in fact consist of several banks, one of each bit of the information it transfers, in which case each segment and each pickup arm shown represents a group of such elements. The pickup arms of the several stages are rotated synchronously and in phase coincidence under control of synchronizing signals derived from the central timing source, namely, the terminal 205 (FIG. 2E), of the main file 201. Each set of similarly numbered segments of the several stages of this distributor 217 defines an operator's time slot during which events associated with a particular operator's request take place. The pickup arms, as they rotate, effectively poll the operators consecutively, as to their needs. Additional distributor stages, not shown, may be included to serve purposes ancillary to those about to be described.

When an operator, for example, operator No. 1, receives a request for a telephone number, the operator commences immediately to "type" the requested name on the keys of a codewriter 220 (FIG. 2B). Thus, if the number asked for is that of Harold K. Lessing, the operator depresses, consecutively, the keys labeled "L" "E" "S" "S" "I" "N" "G". For each key depressed the binary code counterpart of the symbol is passed to a register 221 which, again, may be a part of a single circular track on one of the discs. Whatever its construction, it is important that this registration be preserved after readout and until it no longer serves any purpose. At the same time, the depression of each key trips a bistable unit, such as a flip-flop 222, theretofore resting in one of two stable states, into the other. On the next pass of the pickup arms past the No. 1 segments of the distributor 217 the characters "typed" to date are picked up and passed, as 6-bit code pulse groups, though the first stage 217–1 of the distribtuor, to a symbol gate 224 while the indication that a symbol has been typed during the current revolution of the distributor is applied through the second stage 217–2 to one input point of an AND gate 225 which partially controls the symbol gate 224. Provided a recycle control unit 226 does not indicate that the control circuitry is engaged in dealing with other requests, the characters typed to date and stored in the register 221 thus pass through the symbol gate 224 to a symbol register 227. At the same time, a code identifying the particular operator, in this case operator No. 1, passes through the third stage 217–3 of the distributor and through an operator gate 228 to an operator identify register 229. A 7-bit code suffices to identify any one of one hundred operators, and the necessary code groups are generated, in turn, by an operator code generator 230 of any desired type. As a matter of convenience, such codes may advantageously be stored on one of the discs, set aside for the purpose.

The appearance of a signal on the output conductor of the symbol gate 224 acts immediately, through the fourth distributor stage 217–4, to restore, the flip-flop 222 to its initial condition, whereupon no further information originating with operator No. 1 passes through the symbol gate 224 to the symbol register 227 or through the operator gate 228 to the operator register 229 until operator No. 1 shall have typed a new symbol. Thereafter, next time the apparatus becomes available to operator No. 1, these operations are repeated. In the interim the apparatus will have been made available to other operators.

Assuming that the apparatus is idle before the typing of the first symbol by the designated operator, the first symbol that appears in the character register 221 in the "LESSING, HAROLD K." example is "L." This registerede symbol is to be compared in turn with the initial symbols of all of the partial words stored in the coarse index. To this end an index selector 231 (FIG. 2A) which responds to an actuating signal peculiar to the idle or cleared state of the apparatus selects the coarse index in preference to any of the fine indices and delivers the items stored in its consecutively to a code selector 232. This unit passes the word portion of each index item to a comparator 233 suppressing the associated numerical designation of a particular fine index.

Comparison takes place in alphabetical order of the index words, commencing with the first and running through to the last. Hence during the early portions of the comparison, the index word is of lower numerical order than the registered word and during the later phases of the comparison the index word is of higher numerical order than the registered word. During an intermediate phase of the comparison one or more index words may be encountered having the same numerical designation as the registered word and, the smaller the number of characters registered to date, the greater will be the number of such equalities.

All three conditions enumerated above, namely, "I<R" (index word of lower order than registered word), "I=R" (index word of the same order as registered word), and "I>R" (index word of higher order than the registered word), are utilized in the course of the operations to be described. Accordingly, the comparator 233 is provided with three output terminals. On the first of these (683) it delivers a signal at the moment at which the first condition is departed from, i.e., at the moment at which the first condition changes to the second condition or the third. On the second output terminal (662) it delivers a signal indicative of equality between index word and registered word while, on the third output terminal (673), if delivers a signal at the moment at which the first condition or the second condition changes to the third condition. Evidently, when there are no equalities, the signal on the upper output terminal occurs at the same instant as does that on the lower output terminal while, if an equality or a string of equalities is encountered, the signal on the upper output terminal occurs at the commencement of the string and the signal on the lower output terminal occurs at the conclusion of the string.

Passing, for the present, the operations that take place in response to the signals on the upper and lower output terminals of the comparator 233 and returning to the particular example, in a list of 200 partial words, there are several whose initial letters are "L." Hence, as the coarse index is scanned, the comparator 233 indicates on its second output conductor that several equalities have been encountered. This signal is applied to counter 234 (FIG. 2C) which counts the number of equalities thus encountered and indicates the result of the count on its lower output terminal, advantageously in a code representing a number that is next higher in the number series than the number of equalities counted. The significance of this signal is that the symbols typed to date by the designated operator do not define a location in the course index with sufficient exactitude to specify a fine index.

Under these circumstances the apparatus should be made available, as promptly as possible, to some other operator who may meantime have registered the initial characters of a different item with sufficient percision to make for a successful comparison either with the coarse index or, if that has already been completed, with the selected fine index. To this end the equality count signal is passed through an AND gate 235 (FIG. 2D) unless the latter be inhibited by a batch signal, in the fashion later to be described, to a recycle control unit 226 which responds by delivering on its upper output terminal a "clear" signal which is passed by paths not shown to the "clear" terminals of several apparatus components, notably the counter 234, the symbol register 227 and the operator identity register 229. At the same time the recycle control unit 226 delivers a signal of longer duration to the upper input point of the AND gate 225 thus to enable the symbol gate 224 on the next receipt via the second distributor stage 217–2 of an indication from any operator's console 203 that a new symbol has been typed. In this way the matching apparatus is released for use by other operators of the group.

In the interim, and while the comparison of index words, coarse or fine, with the word stored by operator No. 1 in the register 221 (FIG. 2B) has been in progress, any seizure of access to the matching apparatus by another operator, who may have just completed the registration of a different word, is prevented by application of a control signal of appropriate polarity to the AND gate 225 (FIG. 2D) and derived from the lower output terminal of the recycle control unit 226 in response to an input signal to the recycle control unit applied to its lower input point from the output terminal of the symbol gate 224.

This denial of access to any other operator thus commences by the passing into the symbol register 227 (FIG. 2D) of the characters in the character register 221 (FIG. 2B) and ends with the generation of a "clear" signal upon completion of a comparison operation, whether successful or unsuccessful, as described above.

Meantime, the designated operator is proceeding with the typing of the name inquired for; illustratively, the name LESSING, HAROLD K. In the course of further specification of the name, a point is reached, e.g., after the typing of LE, LES, at which there is not more than a single correspondence with a word of the coarse index, in this case none at all. (In the case of a name such as John P. Smith, this point is not reached until later. There may be several John P. Smiths, one John Peter Smith, and no John X. Smith.) When this point is reached, the counter 234 (FIG. 2C) delivers, on its upper output terminal a signal which signifies "less than two coincidences." This partially actuates a location gate control unit 236. At the moment the equality is terminated, a signal indicating the termination is applied, from the lower output terminal of the comparator 233 (FIG. 2A) to a second input terminal of the location gate control unit 236 (FIG. 2C), thus to complete the enablement of the gate control unit and open a location gate 237 to accept the serial number of the matching word as it appears in a location delay register 238 and pass it on.

The manner in which the correct location designation has been stored in the location delay register 238 is as follows. As the partial items of the coarse index are read out one by one, the code selector 232 (FIG. 2A) passes the location designation component of each such item through a delay device 239 to a location delay gate 240 (FIG. 2C). The delay device 239 is proportioned to retard the stream of such designations by a single index item time, i.e., by $\frac{1}{30}$ second for a full revolution of the drum 216, modified by the occupancy factor of a single one of the two hundred index items. Thus, at the instant at which the comparator 233 (FIG. 2A) indicates that the index words are no longer of lower order than the registered word and, by application of a signal on its upper output conductor to the location delay gate 240 (FIG. 2C) opens this gate, the numerical designation passed by the gate 240 to the location delay register 238 is that of the last preceding index item; i.e., the location of the last item for which "I<R."

Returning to the operation of the location gate control unit 236, now fully enabled, it thus, by opening the location gate 237, passes the numerical designation of the coarse index item next prior to the equality, if an equality, has been encountered, and, if no equality has been encountered, of the item next prior to the transition from "I<R" to "I>R".

The location delay register 238 has now served its purpose, for the present, and it is cleared, after a brief delay introduced by a delay device 241, by the output of the location gate control unit 236, acting through an OR gate 242. In case the location gate control unit 236 shall not have been actuated, as in the case of two or more equalities indicated by the comparator 233, the location delay register 238 is, alternatively, cleared by the signal appearing on the upper output terminal of the recycle control unit 226 (FIG. 2D) acting through the OR gate 242.

In principle, the location designation thus passed by the location gate 237 may operate to pick one, and only one, of the set of fine indices. To insure success in the ultimate location of the correct point in the main file 201 from which information is to be read out, it is preferred that the designation thus passed by the location gate 237 shall operate to pick up a single fine index but two alphabetically consecutive fine indices. It is this designation which is passed by the location gate 237 to a location register selector 243. At some earlier time the operator gate 228 (FIG. 2D) will have passed the operator's identification code to the operator identification register 229 and thence to the location register selector 243 thus to select a particular one of the registers 244 of the set, e.g., the register 244–1 assigned to operator No. 1, to accept the location code. Under control of the same operator identification code, the location code thus registered, in contrast to one registered in the name of another operator, is passed by an output selector 245 to an output point 246 and thence back to the index selector 231 (FIG. 2A) to energize a read-out head; or heads, associated with the selected pair of fine indices, namely, the ones, illustratively, in which are the words commencing with the letters L E S. Each of these words has associated with it a number and the numbers are arranged in order.

Because each of the fine indices contains only fifty items, it is possible to arrange several such indices on a single set of tracks, one track for each bit of the coded designations. In this event the scanning of two consecutive fine indices can, in many cases, take place in the course of a single revolution of the index drum 216. In cases where the consecutive indices appear on different tracks, the read-out may be switched from one to the other at the proper moment under control of timing signals in well known fashion. At the cost of a slight redundancy even these switching operations may be obviated by introducing a slight overlap of indices as between different sets of tracks. For example, indices numbers 1, 2, 3 and 4 may be stored on one set of tracks; indices 4, 5, 6 and 7 on a second set; indices 7, 8, 9 and 10 on a third set, and so on. Thus, indices 1 and 2, 2 and 3, 3 and 4 can be consecutively read out from the first set of tracks without switching while, if indices 4 and 5 are to be read out consecutively, the read-out can take place from the second set of tracks.

The output signal thus appearing at the output point 246 (FIG. 2C) of the output selector 245 is also applied to a gate control unit 247. This signal, which specifies the desired pair of fine indices, is of a precision corresponding to one part in two hundred. It can thus be represented in 8-bit code. The gate control unit 247 is constructed to respond only when the location signal is of a precision many times as great. Hence, for the present, the gate control unit 247 does not respond.

Meantime, the operator has continued with the typing of the name. In a small community she will have specified it sufficiently by typing L E S S I. In a city of intermediate size she may have specified it sufficiently by typing L E S S I N. In a city of the size of NEW YORK she may not have specified it sufficiently until she has typed L E S S I N G. When this time comes, however, she will have specified it with sufficient precision to identify a single one of the names contained in the selected fine index and hence the location of this name as it appears in the main file 201 (FIG. 2E). Accordingly, the comparator 233 (FIG. 2A) which has meantime been comparing the numerical values of the words of the selected pair of fine indices with the numerical values of registered words, and which has been indicating more than two equalities on each revolution of the drum 216 now indicates only a single equality. (In other examples, the indication may be that there are no equalities at all.) At this time, therefore, the upper terminal of the counter 234 (FIG. 2C) is energized, thus partially to enable the location gate control unit 236.

This unit is fully enabled by the signal appearing on the lower output terminal of the comparator 233 (FIG. 2A) at the instant at which the indication changes from "I<R" to "I>R," i.e., the moment at which the equality is terminated. As before, the number associated with the last index word for which "I<R" has been previously read out of one of the two fine indices, appropriately delayed by the device 239 and stored in the location delay register 238 (FIG. 2C) in response to a signal which appears on the upper output conductor of the comparator 233 at the moment at which the equality commenced.

This number is now passed through the location gate 237 thus actuated, into the operator location register 244–1 where, in principle, it is combined with the fine index number earlier registered, thus to provide, at the output terminal 246, a sepecification of the desired location in the main file 201. From here it passes back to the index selector 231 (FIG. 2A) but, in the absence of further indices of still higher degrees of fineness, the index selector 231 does not respond to it. The same signal, appearing at the output terminal 246 (FIG. 2C) is also applied to the gate control unit 247 as the code counterpart of the numerical designation of the fine index word thus picked.

As with the coarse index, the words of each fine index may be serially numbered, e.g., from 1 to 50, and accordingly any of these numbers may be expressed in a code group of 6 bits. This code, as combined with the 8-bit code identifying the selected fine index, results in a 14-bit code which is sufficient, after translation into suitable form, to identify the desired location in the main file. To avoid the need for such further translation, however, the numbers assigned to the fine index words may themselves advantageously be stored in the form of direct numerical designations of the locations in the main file at which particular blocks of items, each commencing with one of the numbered words of a fine index, are to be found. Each of these designations may identify a particular one of twenty-four discs (5 bits), one or the other of its two sides (1 bit) a particular one of 800 circular tracks (10 bits) and a particular angular sector (3–10 bits). Such a detailed designation requires some 26 bits, in contrast to 14. Nevertheless, it is preferred to assign the code numbers in this form, needing no translation, to the individual words of the several fine indices.

The gate control unit 247 is constructed to respond to the appearance at is input terminal of such a 26-bit designation and to open a three-path gate 248 which passes, on its upper path the location designation, on its lower path the operator identification and, on an intermediate path, a designation of the size of the batch, i.e., the length of the block of entries required.

The extent of the block of items that must be extracted from the main file 201 in order to insure that a particularly desired item shall be found within it is in approximate proportion to the number of equalities encountered in the matching process. Thus, if a single equality has been encountered, a block of one hundred items will suffice while, if no equalities have been encountered at all, a block of fifty items will suffice and this block is the one immediately preceding the point at which the transition takes place from "I<R" to "I>R." Moreover, situations arise in which the inquiring subscriber cannot furnish the operator with sufficient information with which to identify a block of one hundred items, in which case a still larger block is to be extracted, i.e., a block of a length related to the number of equalities encountered.

Because the length of the block to be extracted is related in this way to the number of equalities encountered, the count appearing on the lower output terminal of the counter 234 may advantageously serve as the batch size signal. Indeed, it is for this reason that the counter output is coded in the fashion described above; i.e., no equalities encountered calls for a single batch of fifty items; one equality encountered calls for two such batches, or a block of one hundred items; four equalities calls for a block of two hundred fifty items, and so on.

As described above, the location gate control unit 236 actuates the location gate 237 only when a single equality, or none at all, is encountered. Under the special circumstances that the operator is unable to specify the location in the main file to the required precision for automatic operation of the location gate 237 as described above, the operator may nevertheless cause extraction from the main file 201 of a block of items in excess of one hundred by manual operation of a batch size key 249 (FIG. 2B) with which each operator's console is provided. This unit passes a signal over a path not shown to actuate the location gate control unit 236 (FIG. 2C) on demand and despite the lack of the appearance of a "<2" signal on the upper output terminal of the counter 234.

The word comparator

It is the function of the comparator 233 (FIG. 2A) to match each of the partial words registered to date by the operator, commencing with the single character initially registered, first against all of the words of the coarse index and, after two of these have been picked, against all of the words of the selected fine indices, thus to pinpoint a location in the main file 201 (FIG. 2E). To economize time expended in the entire operation, it is a feature of the comparator 233 here employed that it reaches its decision at the earliest possible moment at which such a decision is logically possible; i.e., if a sufficient number of characters have not yet been typed to identify a single index word, it reaches a decision to release the access mechanism for use by other operators within 1/30 second. If, to the contrary, a sufficient number of characters have been typed by the operator and hence stored in the symbol register 227, the comparator 233 reaches a contrary decision to the effect that sufficient information is now available to proceed to the next step, be it selection of a particular pair of fine indices or of a particular location in the main file 201. Again, it reaches this decision in 1/30 second.

Figure 6:
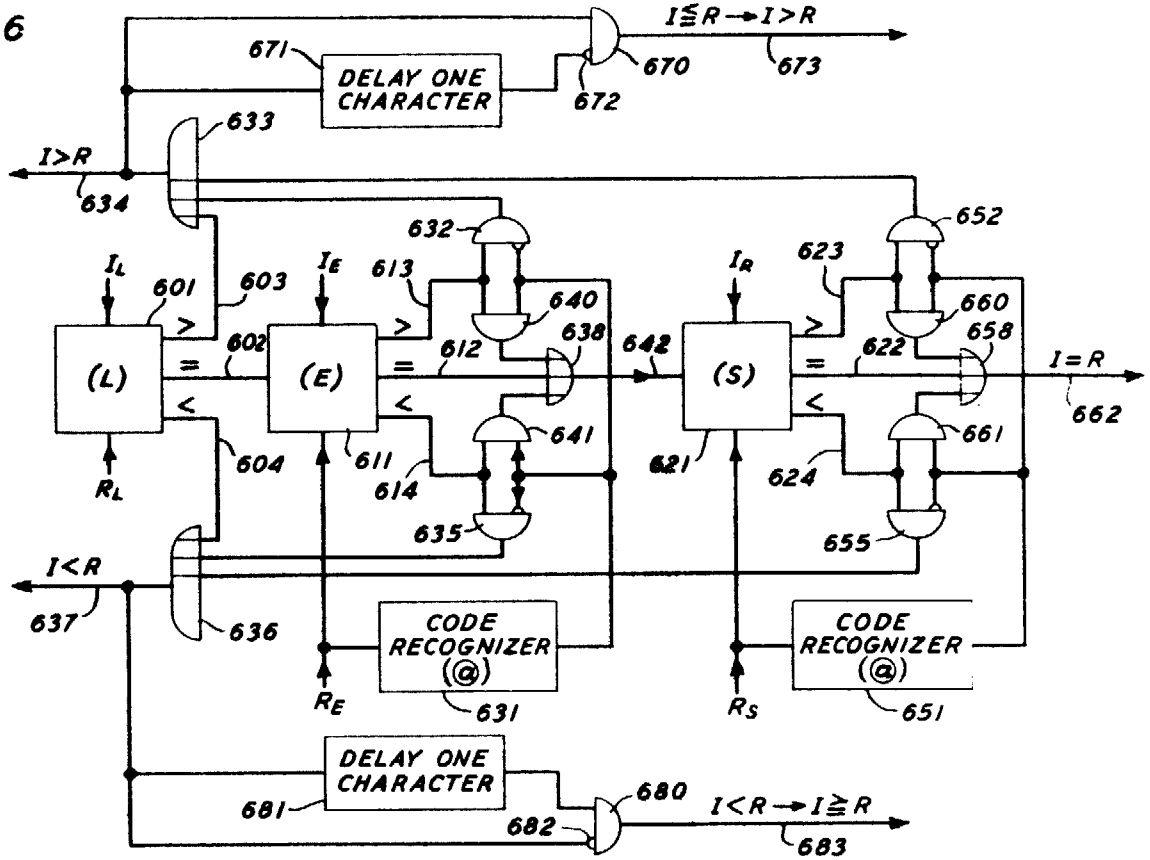
FIG. 6 is a block schematic diagram showing a word comparator including a number of individual character comparators.
Figure 7:
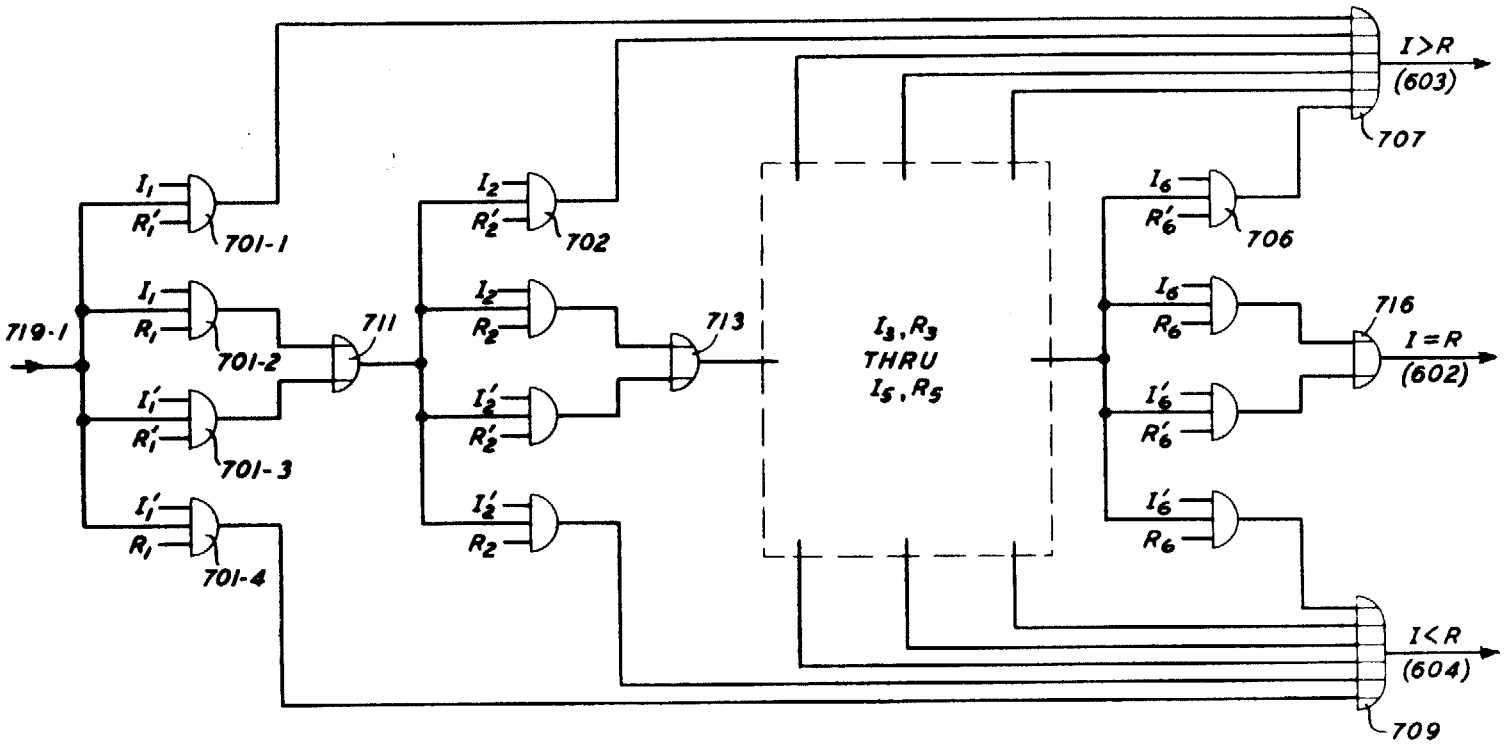
FIG. 7 is a block schematic diagram showing the structure of any of the character comparators of FIG. 5.

FIGS. 6 and 7 show apparatus by which these decisions are reached with certainty and rapidity. Of these, FIG. 6 shows a 3-stage word comparator of which the portions of the several stages shown as boxes 601, 611 and 621 are character comparators. A typical one of these character comparators, for example the second one 611, is shown in FIG. 7. Inasmuch as the individual symbols of the alphabet, Arabic numerals, spaces, punctuation marks, and the like require six bits for their definition, the character comparator of FIG. 7 contains six stages, of which the first two and the last are shown, the third, fourth and fifth being merely indicated.

Referring now in detail to FIG. 7, six bits of the registered word are designated $R_1$, $R_2$, . . . $R_6$ and the six bits of the index word are designated $I_1$, $I_2$ . . . $I_6$, the bits being arranged in descending denominational order: that is to say, $R_1$ is the most significant bit of the registered word and $R_6$ is its least significant bit, etc.

At the left-hand side of FIG. 7 four AND gates 701–1 through 701–4 are provided and to the principal input points of these AND gates the first bits of the registered word and of the index word are applied in all possible combinations, positive and negative, producing four conditions, namely:

(a) $I_1=1$
$R_1=1$ $(R_1'=0)$
(b) $I_1=1$
$R_1=0$ $(R_1'=1)$
(c) $I_1=0$
$R_1=1$ $(R_1'=0)$
(d) $I_1=0$
$R_1=0$ $(R_1'=1)$ where the prime stands for inverse, opposite or negative, all of identical meaning in the binary system.

Because of the nature of the binary code, the initial digits, $R_1$ and $I_1$ of the two characters R and I must fall into one of the four groups listed above and hence must actuate one of the four AND gates 601. Thus, under condition (a) the AND gate 701—2 is actuated, under condition (b) the AND gate 701–1 is actuated, under condition (c) the AND gate 701–4 is actuated while under condition (d) the AND gate 701–3 is actuated. Actuation of the AND gate 701–1 indicates that the first digit of the index word is greater than the first digit of the registered word and the output signal of the AND gate 701–1 passes through the upper OR gate 707 to provide this indication. By the same token, actuation of the AND gate 701–4 indicates that the first digit of the index word is less than the first digit of the registered word and the output of the AND gate 701–4 passes through the lower OR gate 709 to provide the contrary indication.

If either of these two conditions obtains for the first digits, the dissimilarity of the two entire 6-digit characters I and R is determined. If, on the contrary, the first digits are alike [condition (a) or condition (d)], similarity or dissimilarity is not yet determined and a comparison must be made between the second digits of the two characters. Accordingly, the output signals of the AND gates 701–2 and 701–3 of the first bank are applied to the input terminals of an OR gate 711, thus to provide an enabling signal for all four AND gates 702 of the second bank and this is applied to the No. 3 terminals of all of these AND gates 702.

Comparison among the No. 2 digits takes place as before to pass an output through the upper OR gate 707 if the second digit of the index word is greater than that of the registered word, through the lower OR gate 709 if it is less and on to the third stage for repetition of the process if they are alike.

Proceeding in this fashion through all six digits, the output signal of the upper OR gate 707 indicates that the numerical magnitude of the entire character of the index word is greater than that of the registered word, an output from the lower OR gate 709 indicates that it is less, and an output from the central OR gate 716 indicates that the two characters are alike.

Referring now to FIG. 6, the entire structure of FIG. 7 is to be considered as contained in each of the boxes 601, 611, 621. Three such boxes are shown illustratively to compare the registered partial word L E S with the successive partial words of the coarse index. Assume, for illustration, that the comparison discussed above in connection with FIG. 7 indicated "I=R" for the first registered character; illustratively, more than one word of the coarse index begins with L, the first character of the registered word. This equality signal is passed by the box 601 on its output conductor 602 to the second box 611 of the word comparator where it appears on the enabling conductor 719 of the first bank of AND gates 710 of FIG. 1. Comparison of the successive digits of the second registered character with the second character of the index word proceeds, as described above for the first character, and results in a decision either that the index word is greater than the registered word, thus to deliver a signal on the upper output conductor 613 of the second box 611 that it is less, thus to deliver a signal on the lower output conductor 614 of the second box; or that they are alike, thus to deliver a signal on the central output conductor 612 of the second box. If the index character is the greater of the two and if a code recognizer 631, to be described below, has not delivered an inhibiting output, the "greater than" signal passes through an AND gate 632 and an OR gate 633 to the upper output terminal 634. Similarly, if the index character is the lesser of the two, the signal from the lower output terminal 614 of the second box 611 passes through an AND gate 635 and an OR gate 636 to the lower output terminal 637. In either event, dissimilarity has been observed, and the third character box 621 is not called upon to act, so that its enabling conductor, namely, the equality conductor 612 of the second box 611 remains unactivated.

If, instead, the second characters of registered word and index word are alike and if, therefore, further comparison with the next registered character requires to be made, the signal appearing on the equality conductor 612 of the second character box 611 passes through an OR gate 638 to the enabling terminal of the third character box 621, whereupon, the entire process is repeated for the third character. Thus the decision is made with completeness and with certainty at the earliest possible moment.

While FIG. 6 shows three stages, suitable without addition for coarse index comparison, the apparatus may, in fact, comprise some eleven or twelve stages in order that it may operate equality well for comparison with the fine index words as for comparison with the coarse index words.

Referring again to FIG. 7, all six digit stages are alike, as shown, each bank of AND gates 701, 702 . . . 706 being provided with an enabling conductor, of which the first one, 719, is shown. This is, in fact, required for all character boxes 601, 611, 621 of FIG. 6 with the exception of the first, since it is the successive conductors of this class that pass the decision problem along from stage to stage of the word comparator of FIG. 6. Evidently, in the case of the first character box 601 of FIG. 6, the enabling conductor 719 of the first bank of AND gates of FIG. 7 may be omitted.

For successful comparison of a registered word of which the characters are fewer in number than the index word provision must be made to carry out the comparison whatever the as yet unregistered characters may be; in other words, to disregard characters of the index word having precedence positions lower than the precedence position of the last character registered. Specifically, in the illustrative example, the first comparison must be of the registered L with the initial characters of all the 3-character partial words of the coarse index, in complete disregard of what the second character, as yet unregistered, may be. Similarly, once L E has been registered, comparison must be made between this partial word with the first two characters of all the index words, whatever the third character, as yet to be registered, may be. To secure this result a particular code is set aside as standing for "anything at all." As a convenience, the 6-bit code 000000, may be set aside for this purpose, in which case the first alphanumeric symbols to be coded, i.e., "Space," "A," "B" may be assigned codes 000001, 000010, 000011, et cetera, other alphanumeric symbols being assigned various other binary codes, preferably on a systematic, numerical basis.

Because the code, 000000, represents the normal state of a register when it is completely cleared, and therefore the state of all of its stages beyond those into which particular characters have been registered, this code may with convenience, be assigned to stand for the universal symbol which, for the sake of designating it in noncode form, may be represented "@." Referring again to FIG. 6, the second character of the registered word is applied, not only to the lower input point of the second character box 611 but also to the code recognizer 631. This unit is proportioned to deliver an output if, and only if, the second symbol in the register is the universal one @; that is to say, if only one alphanumeric symbol has been typed. The output of this code recognizer 631 is applied in parallel to inhibit terminals of the first and fourth AND gates 632, 635 which follow the second box 611 and to actuate terminals of the second and third AND gates 640, 641. With this arrangement, if the second symbol, illustratively E of the name LESSING, has not yet been typed and hence is not registered, the first and fourth AND gates 632, 635 are inhibited and the second and third AND gates 640, 641 are actuated, thus to deliver on the output terminal 642 of the second stage 611 and through the OR gate 638 a signal of the same kind whether the index character be greater than the registered character, less than the registered character or equal to it. Thus the question to be decided is passed along from the second stage to the third in the same way and in the same form whether the index character be greater than the registered character, less than the registered character, or equal to it in numerical value.

In the same way the third character of the registered word is applied not only to the lower input point of the third character box 621 but also to a second code recognizer 651, similarly constructed to respond only if the third symbol is the universal symbol @, meaning that only two characters have as yet been typed. The output signal of this code recognizer 651 when present, is applied, as before, to inhibit terminals of two AND gates 652, 655 and to actuate terminals of two other AND gates 660, 661 thus to provide on the output conductor 662 of the third stage a signal of the same kind, whatever the third character of the index word may be.

Thus the question to be decided is passed along from each stage to the next in the same way and in the same form and in complete disregard of the identity of any characters in the index word beyond those that have already been found to be identical with the characters of the registered word as typed to date.

The signal thus developed on the output terminal 662 of the comparator may be designated an "apparent" equality signal which, however, is identical in form with the "true" equality signal that appears when the partial registered word is indeed identical with the index word. This equality signal, true or apparent, is passed along to the counter 234 as described above in connection with FIG. 2C, whereupon operations take place as described above in response to the number of such equalities counted.

In the course of the sequential read-out of the partial items of an index, coarse or fine, a blank between such items may appear in the form 000000; i.e., in the code illustratively selected to represent the universal symbol @. Provision of any desired sort must of course be made to prevent this code from reaching the comparator and upsetting its operation. For example, an auxiliary code recognizer identical with the units 631 and 651 may be associated with the paths by which index signals are applied to the comparator. This unit, responding to the presence of the universal symbol in an index word, can block passage of signals from all three output points of the comparator when it occurs.

The apparatus of FIGS. 6 and 7, therefore, reaches its decision (two or more equalities; one equality or none at all) and directs appropriate action at the earliest moment at which sufficient information is available to render the decision logically possible. This is in sharp contrast to other systems in which comparison between a registered word and an index word cannot commence until a registered word is a complete one and has been so designated; e.g., by the typing of a special "end of word" symbol.

In addition to the "I=R" signal appearing on the second output point of the comparator 233 (FIG. 2A), this unit is required to deliver, on its upper output terminal, a transition signal at the instant at which the condition "$I<R$" changes to the condition "$I\geqq R$" and, on its lower output terminal, a signal when the condition "$I\leqq R$" changes to the condition "$I>R$." These transition signals are readily generated with the apparatus of FIG. 6 by taking into account the logical equivalence of the notion "equal to or less than" with the notion "not greater than" and the logical equivalence of the notion "equal to or greater than" with the notion "not less than." Thus the signal appearing on the output terminal 634 of the upper OR gate 633 is combined in an AND gate 670 with the same signal, retarded by a single character time by a delay device 671 and inverted by an inhibit terminal 672, to develop a pulse on the output conductor 673 when the signal "$I>R$" on the output terminal 634 changes its character. This is identically the signal appearing on the lower output terminal of the comparator 233. In a similar way the signal appearing on the output terminal 637 of the OR gate 636 may be combined in an AND gate 680, after retardation by a delay device 681, with a counterpart of itself, inverted by an inhibit terminal 682, to develop a pulse on an output conductor 683 when the output of the OR gate 636 changes its character. This is identically the signal required to appear on the upper output terminal of the comparator 233.

Individual operators' location registers

From what has been said, one purpose served by the assignment of individual location registers 244 (FIG. 2C) to the several operators will be apparent; namely, to preserve, after the successful comparison with the coarse index, the resulting fine index identification so that in the subsequent comparison of the registered word with the words of the fine index, the earlier coarse index comparison need not be repeated.

In addition, and in connection with certain ancillary features, it is also advantageous to preserve a registration of the location, in the main file 201, of each block of items called for by each operator, to preserve it in a fashion coordinated with the identity of the operator calling for it, and to do so until that operator has completed the processing of an inquiry and turned to the next one. The reasons for this coordinated registration, instrumented by the individuation of the operators' location registers and their contents, will appear more fully below.

Once the 3-path gate 248 (FIG. 2C) is opened to the three signals (location, batch-size and operator identity), by the gate control unit 247 actuated as described above, they are passed to a sequencing unit 255 which, in effect, places them in three parallel, synchronous queues, thus stacking them in order of precedence with similar signals identifying other locations in the main file, and the other operators requesting them, together with the batch sizes requested. This sequencing unit may be constituted of three signal path units arranged side by side and operated in synchronism by a common clock control. Each such unit may be of the construction described in Saal-Welber Patent 2,935,569.

Once the request in question has reached the head of the queue, the location signal, through the agency of a read-out control unit 256 (FIG. 2E), operates to select a particular disc of the main file 201, one or other of the two sides of this disc, a particular track on the disc side selected, and to move the nearest read-out head into juxtaposition with that track. The batch-size signal controls the number of tracks read out.

The operations described lead to juxtaposition of a selected read-out head with a selected block of entries and to the actuation of this read-out head when the block begins to pass by it, thus to read out the entire block into the digital buffer 204, thereupon it is decoded, converted first into alphanumeric symbols and then into a video signal for delivery through the distributor 210, controlled through a distributor control unit 257 by the operator identity signal from the sequencing unit 255 (FIG. 2C), to the video buffer store 214 (FIG. 2B) assigned to the operator requesting it, all as described above. Also, as described above, a part only of this video signal is cyclically picked off the video buffer 214 and presented on the screen of the operator's viewing tube 211 while the operator, by actuation of the window control unit 215 causes the selected portion to progress through the recorded portion, thus to present to the eyes in large, clear letters and numerals, a readily controllable sublist of some 10–20 entries.

Clearing of registers

In the apparatus described above, the equality counter 234 (FIG. 2C) and the various registers act to process various parts of requests originating with various operators. Logically, each time any such unit has either completed one such assignment or has positively failed, for want of sufficient information, to complete it, it should be cleared to place it in readiness to accept a new assignment. The recycle control unit 226 (FIG. 2D) delivers such clearing signals as are necessary for this purpose and may be of well known construction.

For the sake of simplicity and uniformity, each register for which this is possible is advantageously constituted of individual tracks on one or more of the discs, set aside for the purpose. In such case the clearing signal acts to erase whatever information may have been there recorded. But it is a consequence of the employment of magnetizable tracks in this fashion that new information may be written on top of old information and that this may be repeated practically indefinitely, the latest information being as legible as though it had been written on a blank surface. Hence, for the most part, these clearing signals are not, in fact, required. In special instances such as that of the counter 234 (FIG. 2C) this unit may be cleared, each time the location gate control unit 236 is actuated, by a clearing signal of well known character developed by the recycle control unit 226 (FIG. 2D) as described above. In instances such as the individual operator location registers 244 (FIG. 2C) and the operator's character register 221 (FIG. 2B), registration is to be held until the processing of an incoming request by the operator to whom it is assigned is completed. Thereupon a clearance signal which, if the register is one of the disc tracks may take the form of an erasure signal, should be applied to it by any appropriate means.

Indices of main file and access mechanisms—second embodiment

Figure 8:
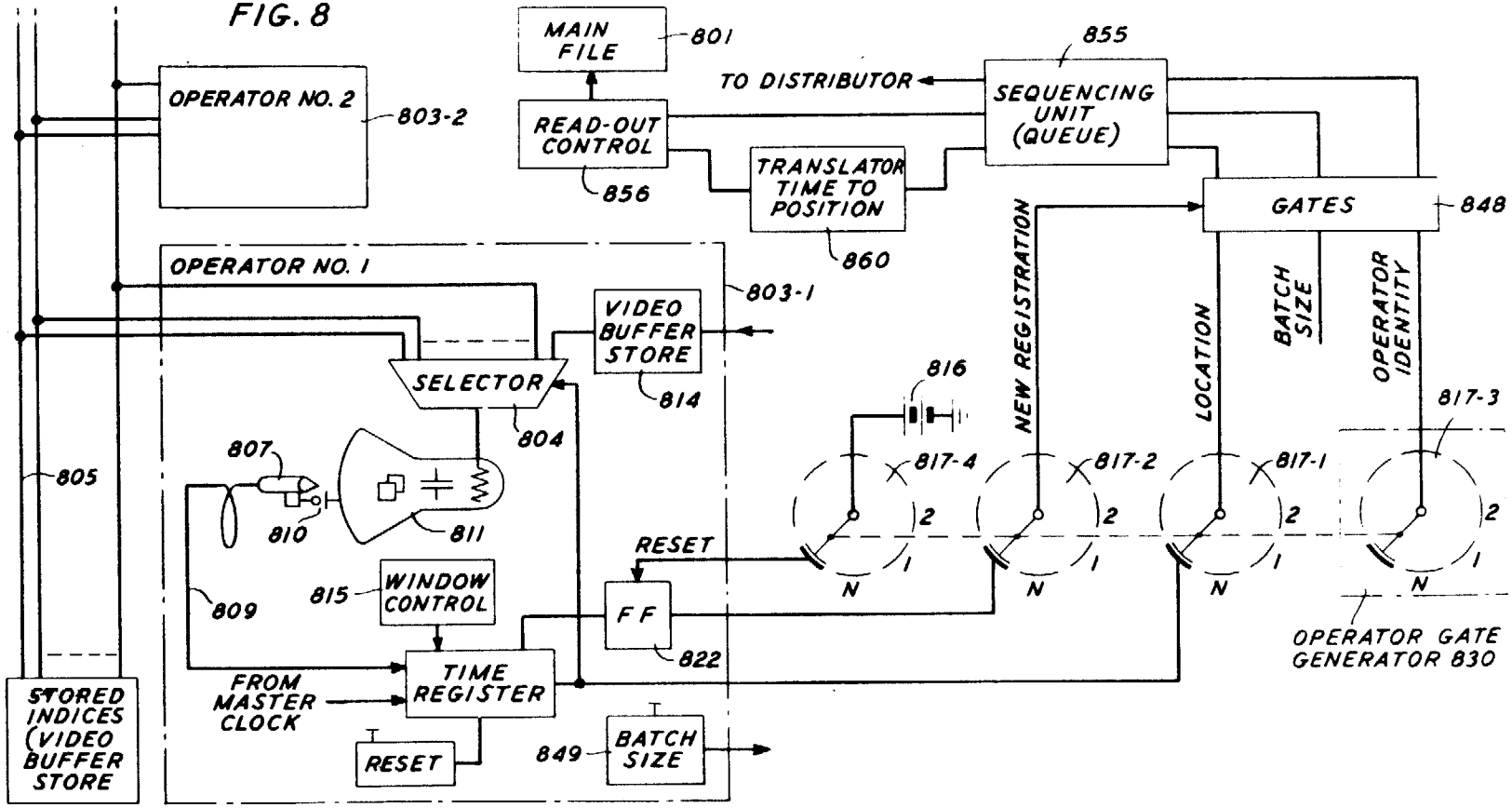
FIG. 8 is a block schematic diagram showing the access-obtaining portions of an alternative embodiment of the invention.

In the apparatus of FIG. 2 the comparisons between registered word and index word are carried out automatically and by digital techniques. In contrast, FIG. 8 shows alternative apparatus in which the comparisons are made with visual and manual assistance from the operator and on the basis of analog techniques. To this end the single coarse index and the 200 fine indices are stored on tracks of one or more of the discs, set aside for the purpose, in the form of video signals suitable for immediate application to the control electrode of the operator's viewing tube 811. When, as described above, the cathode beam of this tube sweeps its screen in exact synchronism with the rotation of the discs, under control of horizontal and vertical sweep generators like those of FIG. 2, synchronization of the index video signal with the sweep of the beam is automatic, and the pattern displayed is stationary.

Initially, before any operator has received a request, an index selector 804 assigned to each operator's console 803 establishes a connection from the output conductor 805 extending from the read-out head juxtaposed with the coarse index track to the operator's viewing tube 811 and the coarse index is thus displayed on the screens of the viewing tubes of all operators not momentarily occupied. For ease of reading, it is advantageously displayed, not in a single column of 200 words but in several columns; for example, in 10 vertical columns of 20 words each. To produce this display it is only necessary that the video signals representing the several words of the index be interleaved with each other on a ten-to-one basis.

Each operator is provided with a stylus 807 carrying a photocell in its tip and a conductor 809 extending to the control apparatus. Advantageously it also includes a switch which may either be actuated manually by the operator, or through a short extension 810 in its forward end, actuated when the operator brings it into contact with the face of the screen.

Upon receiving a request for the telephone number of a particular subscriber, e.g., Harold K. Lessing, the operator who receives it touches the face of the screen of the tube 811 at the point at which is displayed the partial word inquired for it, if the latter is not in fact displayed, the most similar preceding word. As the cathode beam sweeps the screen, it passes the point at which this partial word appears at a certain instant of its sweep cycle, its light actuates the photocell and a signal appears on the output conductor 809 at that instant. Meantime, the successive horizontal scans and fractions of a scan have been counted since the commencement of each vertical scan, and the signal on the output conductor, in effect, stops the count, thus marking the exact time, during a full scanning cycle, at which the beam passed the photocell.

As a practical matter and since the scanning operations in the viewing tube are fully synchronized with the rotation of the disc shaft, which thus serves as a clock, it may be more convenient merely to count the passage of fixed marks on a control track of one of the discs and with which the horizontal scans are synchronized, thus in effect to count the ticks of the clock, than to count the individual scans after they are generated.

The time thus specified serves to identify a particular pair of the 200 fine indices, likewise recorded on disc tracks in the form of interleaved video signals for immediate display on the viewing screen of the tube 811. It is temporarily stored in a code in a time register 813, and the time code thus registered acutates the selector unit 804 which responds by establishing a connection to the read-out head juxtaposed with the track or tracks bearing the specified fine indices, thus to display the selected fine indices on the screen of the tube 811. Preferably, again, the 100 names of which these two indices are constituted are displayed in 10 vertical columns of 10 names each. This may be accomplished as described above in connection with the embodiment of FIG. 2.

Again the operator touches the screen of the viewing tube 811 with the tip of the stylus 807. As before, as the cathode beam passes the point thus touched, the output conductor 809 carries a signal which marks the time, within a full scanning cycle, at which the cathode beam passed that one of the displayed fine index words that most nearly resembled the name inquired for. This time is stored in the register 813. The full registration, now composed of a first part designating a time within the coarse index scan and a second part designating a time within the fine index scan, constitutes a specification sufficiently detailed to identify a location in the main file 801. Accordingly, it actuates a flip-flop 822 which, on the next return of the regulating operator's time slot, opens a three-path gate 848. The registered time code is accordingly passed, along with the operator's identification code orignating in the code generator 830, and with a batch-size code originating in a key unit 849 through a sequencing unit 855 to the read-out control unit 856 for the main file 801. A code translator 860 is interposed to convert time codes into codes more appropriate for specifying main file locations, i.e., a particular disc, one of its two sides, a particular track and a particular sector. The various components of this signal act to select a particular radial arm, a particular pickup on that arm and to move it into juxtaposition with the designated track, and to activate it for the proper time to secure read-out of an appropriate number of items; e.g., 100 in the usual situation, or 250 if prescribed by the batch-size signal. Immediately the registration is completed, the flip-flop 822 is restored to its initial condition, through one stage 817–4 of the distributor by a signal derived from a source 816.

The index selector 804 responds to the refined time designation by establishing a connection from the particular operator's video buffer store 814 to the viewing tube mounted on the same operator's console.

Thereupon read-out from the main file into the digital buffer, decoding, symbol generation, conversion to video signal, application to the video buffer store 814 and display before the operator take place as described above. The operator is provided with the same window control unit 815 as in the case of FIG. 2 and it operates in the same way.

The address file and its uses

On some occasions an inquirer is unable to specify the name of the subscriber he desires to reach with any exactitude but can specify the address; e.g., "a man named Smith at 313 North 12th Street." In case the stated address is that of a small office or residence the specification, vague in terms of the name, is sufficiently precise in terms of the address to identify the correction location in a main file that may be ordered numerically in terms of addreses, rather than alphabetically in terms of names. To cope with such situations, the operators of a telephone information bureau are normally provided with special telephone directories, not generally available to the public, in which the entries are arranged in order of addresses. The system described above can be adapted to this situation with no change of apparatus. The only change required is in the ordering of the information as stored in the main file and in the indices.

Figure 9:
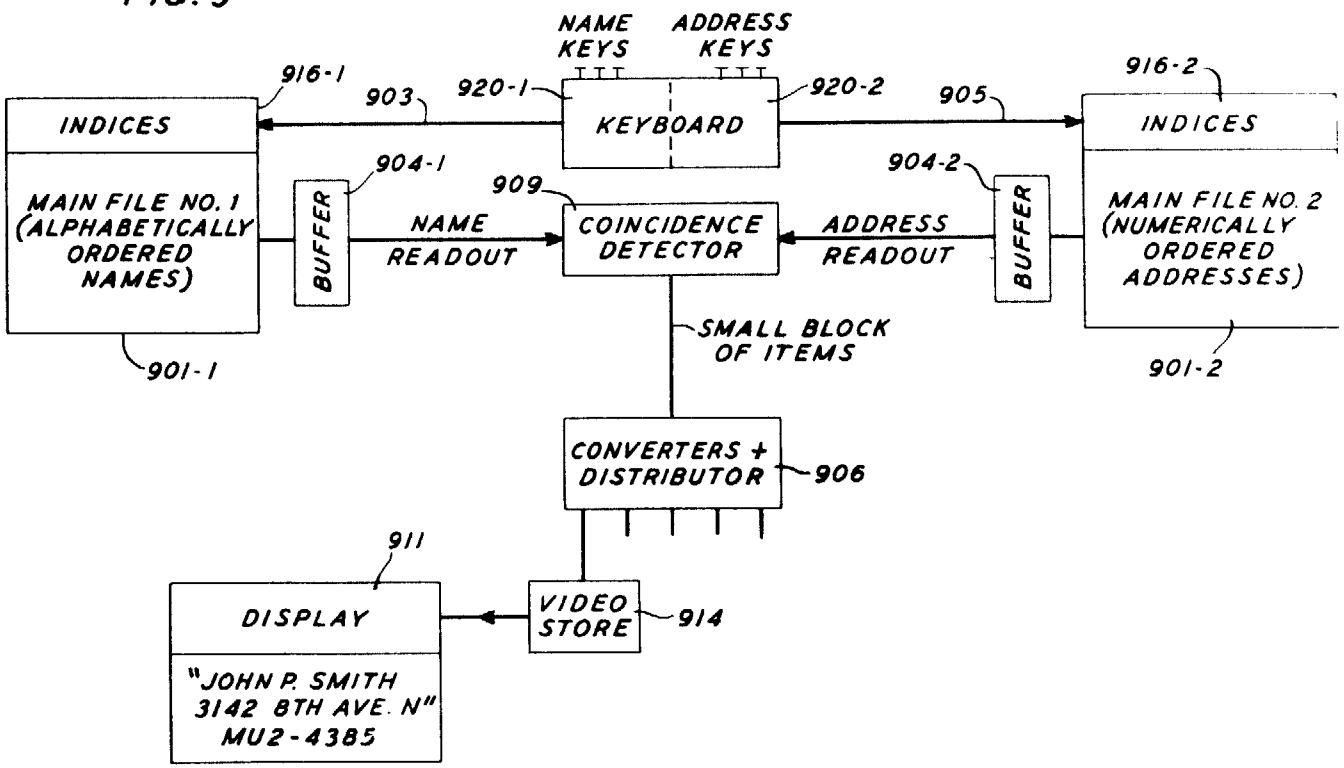
FIG. 9 is a block schematic diagram showing apparatus including a name file and an address file and means for coordinating information simultaneously retrieved from both files.

Other occassions arise in which the inquiry is insufficiently precise on both scores to permit a location in the main file on any single basis. In this situation it is advantageous to make simultaneous use of files and indices of two types. FIG. 9 is a block diagram showing such apparatus in broad outline. Two main files 901–1 and 901–2 are shown, each with its indices 916–1 and 916–2 and its buffers 904–1, 904–2. Main file No. 1, 901–1, is alphabetically ordered. Main file No. 2, 901–2, is ordered in terms of some other parameter, illustratively in terms of addresses, though the ordering could equally well be in terms of professions, firm names, etc. Access to both may be obtained as described above or in some alternative way. For the sake of illustration the access mechanism is shown as being a keyboard codewriter 920 like that of FIG. 2B, provided with a set of name keys and a set of address keys, a name location output terminal 903 and an address location output terminal 905. Each of these may operate, in the fashion described above, thus to furnish a name read-out at the output point of the first main file 901–1 and an address read-out at the output point of the second main file 901–2. After storage in buffers 904–1, 904–2 for quick release of the main files, these are together applied to a coincidence detector 909 that is constructed to respond only when the telephone number portions of its two input signals are alike. It thus delivers, when this occurs, a very small block of information items, usually only a single one. This information item block is now processed, as described in connection with FIG. 2, and displayed on the viewing tube screen at the operator's console or otherwise, all of the display apparatus being together indicated by a block 911 identified "display." In the case of a block of such short length its video signal may be stored on a single circular track on one of the discs, in contrast to the spiral track described above for a video signal representing a block of fifty items or more. Hence, in this case, the window control of FIGS. 2B and 8 may be dispensed with.

Numbers most frequently and least frequently called for

Because of the wide disparity in the personal and business activities of telephone subscribers, a small fraction of the telephone numbers in any directory are inquired for with great frequency. For example, one tenth of 1% or even fewer are inquired for many times per day while a large fraction, 50% or more, are not inquired for more than once a month, if ever.

To economize time and avoid delays due to sporadic pile-ups of requests in the sequencing unit for access to the main file, it may be desirable to provide each operator with a short list of the most frequently called numbers. A skillful operator soon comes nearly to memorize such a list. The list can be presented visually on the operator's viewing tube or it can be printed, as preferred.

By the same token, apparatus economies can be effected by restricting the main file, as installed in any single information bureau, to those items for which inquiry is made from time to time; i.e., to exclude from it the majority of items that are not called for more than once per month, if ever. These can advantageously be placed in a larger main file located at a central point and available on request to the operators at individual bureaus.

Either to construct a list of frequently called items or a list of rarely called items requires the accumulation of statistical information as to requests processed by the information operators. With the aid of certain extensions the apparatus described above readily lends itself to the accumulation of such information. Thus, for example, a photo-sensitive stylus 260 (FIG. 2B) like that with which each operator is provided in the second embodiment, shown in FIG. 8, may be turned to account to serve this purpose. When the information block read out of the main file 201 (FIG. 2E) and displayed to the operator is brought to the approximate center of the field of view by operation of the window control 215 (FIG. 2B) the operator may touch the viewing screen with the stylus 260 at the point at which the desired single information items appears. With the aid of a time register 261 identical with that described above in connection with FIG. 8, the output of the photocell mounted in the stylus 260 can be caused to register a time, within a single vertical scan, that represents the location of the item in question on the viewing screen. The registration of this can be coordinated, by way of a coupling path 262 with the operations performed by the window control unit 215 to specify the exact point within the block at which the requested item appears. This information may be combined in a combining unit 263 with the information as to the location of the block, heretofore registered in the location register 244 (FIG. 2C) assigned to this operator and, as remarked above, still available. It may reach the combiner 263 by way of a cable 264. The combined information is registered in a precise location register 265 and affords an exact specification of the location within the entire main file 201 at which the particular item requested by a particular operator appears. Specifications of this kind and originating with the various operators of the bureau are gathered together by a recent request register 266 (FIG. 2D) whereupon the indivdual operator's precise location register 265 (FIG. 2B) can be cleared. By conventional time-coordinated write-in techniques the fact of each request, originating with any operator of the group, can be recorded in the main file 201 (FIG. 2E) adjacent to the requested item itself. As inquiries come in to the bureau over a period of a month, for example, the coded records of the facts of such requests are accumulated adjacent to some items while no such records appear with the items rarely called for. From time to time and at hours at which the demands for access to the main file 201 do not preclude it, the entire main file can be scanned to select only those items as to which a specified number of inquiries, for example thirty, have been made in a specified period, e.g., during a single day. The items meeting this standard of activity can then be read out of the main file and into a buffer store, not shown, as they are reached, whereupon the items thus registered may be read out into an alphanumeric printer 267 which prints the bulletin of frequency called numbers. As indicated above, it is also possible to convert the digitally registered items in the buffer store into video signals in the fashion described above for presentation on the operator's viewing screen.

Similarly, those items which, on repeated daily examination, are found not to have been requested, can be removed from the main file for insertion in the larger central point main file.

Emergency lists

It is a commonplace that telephone operators serve in important ways in the case of emergencies of various kinds. Most obvious of these in the service performed by an ordinary operator in the case of a fire call or a call for an ambulance. There are many other such instances. For example, when a major disaster such as a fire occurs in an installation such as a Navy Yard, requests for the telephone numbers of persons living in the neighborhood abruptly increases in frequency. Accordingly, there is need for an emergency item bulletin to be constructed on short notice. To this end, ancillary apparatus is provided to monitor the inquiries received by all the operators of the group and when the rate at which inquiries arrive for the telephone number of a particular subscriber is so high as to indicate an emergency, to write the item inquired for directly into the list of frequently called numbers. Thus, a multiple request detector 269 (FIG. 2D) compares the main file location of each item currently stored in the recent request register 266 with all others and, when the repetition rate of inquiries for any particular item is found to reach unusual proportions, the detector 268 opens a special gate 269 which passes the location information as registered to the read-out control unit 256 (FIG. 2E). The entire item is then read out of the main file 201 as with any item requested by way of the indices, but singly; i.e., not as one of a block of 50 or 100. It is then written as a video signal into a special video buffer store 270 (FIG. 2C) of frequency called numbers. These may be presented on the screens of the viewing tubes of all consoles, when not individually occupied in displaying particular items called for.

Thus a connection extends from this special video store 270 to each individual operator's console 203 (FIG. 2B) and, through a path that is normally established through a switch 271 to the modulating electrode of the viewing tube 211. With this arrangement, as the cathode beam scans the face of the tube 211, the emergency list of items frequently called for is displayed to each operator not otherwise occupied. On receipt of an incoming request for the telephone number of such an item, the operator can answer the request immediately without seeking access to the main file 201. Upon receipt of a request for a number not appearing on the special list, access to the main file is sought, as described above, concluding with the delivery of the appropriate video signal to the video buffer store 214. This signal also is applied to a flip-flop switch controller 272 which acts to reverse the conditions of the two switches 271, 218, thus removing the display of the emergency list from the face of the tube 211 and replacing it immediately by the block of items read out of the main file 201.

When the processing of the particular inquiry has been completed and the operator touches the screen of the tube 211 with the stylus 260, thereby to identify the precise location of the item sought for in the fashion described above, the output pulse of the stylus 260 also acts to restore the flip-flop 272 to its initial condition, thus again reversing the conditions of the switches 271, 218 to display the emergency list on the face of the tube 211 once more.

The rate at which inquiries are received for the telephone numbers of airports, railroad terminals, major newspapers, etc. is always high, without indicating any emergency. Thus, ten inquiries in an hour may be unusually high in the case of a corner grocer, and may indicate an emergency, whereas the New York Times' number normally may be called for fifteen times during each hour or each day. To prevent dilution of the emergency list by items for which the injuiry rate is always high, the multiple request rate detector 268 (FIG. 2D) can be programmed to exclude them; e.g., by comparing the inquiry rate during a half-hour period with that during the previous half-hour period, thus to pick, for the emergency list, only those items for which the inquiry rate has markedly risen.

Design and updating of indices

In an active commercial metropolis such as New York City, 3% of the items in the telephone directory are changed each month, either by addition, by deletion, or by alternation. Consequently, as time passes, the indices inevitably get out of date and new ones must be constructed; the fine ones from the main file and the coarse from the fines.

Because the information items are standardized at fifty characters each, and coded with six bits per character, it is a straightforward matter to run through the main file, kept up to date by daily revision, and read out of it every fiftieth item. Each name read out thus forms the basis for one word of one of the fine indices, and fifty such words constitute an entire fine index.

If such an index is to be of a maximum serviceability, each of its partial words should be as short as possible, consistent with the fundamental requirement that it must differ both from its predecessor and its successor in at least one character.

Figure 10:
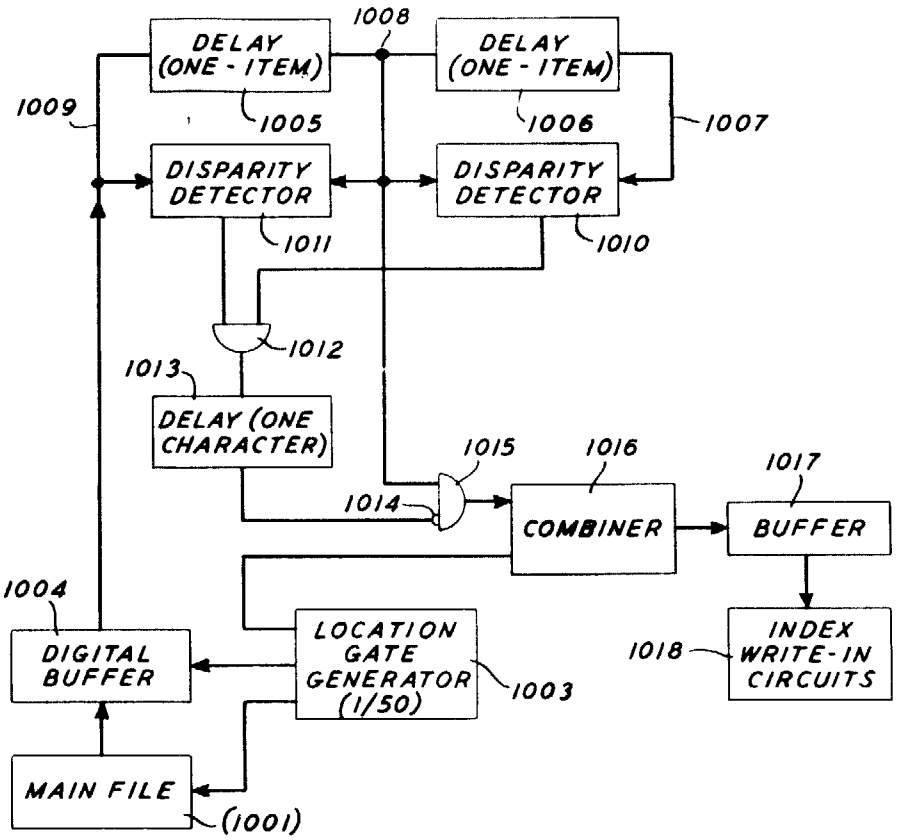
FIG. 10 is a block schematic diagram illustrating apparatus for the automatic generation of indices.

This plan may be instrumented with apparatus as shown in FIG. 10. A location code generator 1003 delivers, in succession, the codes that identify every fiftieth item location in the main file 1001 skipping the intervening ones. Each such code controls the read-out of a single item. For a name index the name portion of each fiftieth item (and for an address index the address portion), without the telephone number portion, is thus read out of the main file 1001 and into a digital buffer 1004. The occurrence of each output from the generator 1003 controls read-out from the buffer 1004 into two delay devices 1005, 1006 connected in tandem. Each of these devices is proportioned to introduce a delay of a full item period, i.e., 50 characters or 300 bits. Thus if, at the far end terminal 1007 the name of item No. 1 appears, item No. 51 appears at the mid terminal 1008 and item No. 101 appears at the near terminal 1009. A disparity recognizer 1010 compares the first with the second, character by character, and another disparity recognizer 1011 compares the second with the third, likewise character by character. Each disparity recognizer 1010, 1011 delivers no output when its two inputs are alike, commencing to do so only when a difference first appears between them. The outputs of the two disparity recognizers 1010, 1011 are applied to the input terminals of an AND gate 1012 and the output of this unit, after equalization of delay by a 1-character delay unit 1013 is applied to an inhibit terminal 1014 of another AND gate 1015 to the other terminal of which is applied the signal appearing at the common terminal 1008 of the two delay devices 1005, 1006. Thus the AND gate 1015 continues to pass the successive characters of the information item as long as they are identical with the corresponding characters of the previous item or with those of the following item, ceasing to do so after a difference from both first appears. Under ordinary circumstances the "word" thus constructed satisfies the requirements stated above for an optimal index word. It is grouped by a combiner 1016 with its location in the main file, as determined by the generator 1003 and the combination is applied, through a buffer 1017, to the index write-in circuits 1018.

Exceptional circumstances in which more is required are illustrated by the three words:

WOOD DR JAMES B
WOODSON JAMES H
WULFSON JANET H

Here the first four characters of the second name are identical with those of the first while the last three are identical with those of the second. In such a situation the apparatus described would, without more, call for continued typing of the entire name WOODSON, JAMES H and beyond. Yet it is obvious from inspection that the second item need only be spelled out, in the index, as far as W-O-O-D-S.

This situation is readily taken care of by incorporating a "latch up" or "hold over" feature into each of the disparity recognizers 1010, 1011 so that, once it has recognized a disparity, it can no longer recognize an identity until after completion of the entire operation for each single index word.

From the set of 200 fine indices thus revised and optimized, the coarse index can be revised in the same fashion whenever occasion demands it.

In the foregoing description and for the sake of definiteness, it was postulated that those items of the main file of which any two successive words of the fine index are parts are separated by not more than 49 other items; i.e., every fiftieth item of the main file forms the basis for a word of one of the fine indices. While this is true immediately the index has been regenerated in the fashion described above, it thereafter becomes less and less true as items are removed from the main file or added to it on account of changes of subscribers' telephone numbers. Hence, occasions may arise when two such items are spaced apart by as few as 40 or 45 other items while two others may be spaced as far apart as 55 or 60 items. In the first case the read-out of two adjacent blocks of 50 items would provide an overlap which would be harmless while in the second case it would make for an underlap which would be disconcerting in that certain items would never be read out in response to any request. To avoid this result it is only necessary to arrange for the read-out, in the normal case, of a block of a sufficient number of items to insure against an underlap, i.e., a block of 55 or 60 items.

Interlacing; parallel processing

It was pointed out above, under the topic "Conversion to Video Signal and Display" and in connection with processing of the block of items read out of the main file into the digital buffer store 204, that the items must ultimately be so arranged on the time scale that the cathode beam of the viewing tube can carry out the eight successive scans required to complete the display of one line of characters before commencing the first scan for the next line. It was remarked that it is one function of the shift register constituents of the digital buffer store to effect this arrangement.

If each item is stored in the main file at a position immediately following its numerical predecessor and immediately preceding its numerical successor, the burden of rearrangement is a considerable one, and requires shift registers of high capacity.

This difficulty can be avoided by initially positioning the several items of a block on an interlaced basis so that, once the read-out has taken place and the bit frequencies have been standardized, the correct arrangement on the time scale is automatic. Thus, if the bit frequency of items read out of the $i^{th}$ zone be denoted $f_i$ and the standard frequency, e.g., the frequency of read-out from the innermost zone, be denoted $f_o$, and if the number of horizontal scans required for the display of an entire item be denoted S, then the interlace factor F, which the items are initially written into the main file, is given by $$F=S\frac{f_i}{f_o}$$

The interlacing of information recorded in a cycle store is frequently resorted to for various reasons. It is described, espeically as applied to magnetic drum storage, under the topic "Access Time and Interlace" in chapter 19 (vol. 2) of "Handbook of Automation, Computation and Control" by E. M. Grabbe, S. Ramo and D. E. Wooldridge (Wiley, 1959) and is utilized by F. Becker in his Patent 2,878,310, Mar. 17, 1959. The interlacing may be introduced, in the initial write in, and thereafter removed when it no longer serves any purpose, under control of timing marks that rotate with the store, as described at page 572 of "Digital Computer and Control Engineering" by R. S. Ledley (McGraw Hill, 1960).

While such interlacing simplifies the construction of the shift registers, it does not reduce the processing time. The time required for frequency standardization and conversion to video signal form remains many times longer than that required for the read-out itself. With a single processing channel as shown in FIG. 2E, a later read-out must wait until the processing of an earlier one has been completed. Under conditions of excessive demand, requests for access to the main file may occur at the rate of one hundred per minute or more. To enforce idleness on the main file throughout the processing of each block of entries read out of it and before the read-out of the next one can take place is not to make the maximum use of its capacities. Accordingly, it is of advantage to provide for the simultaneous processing of several information blocks in parallel processing paths.

Figure 11:
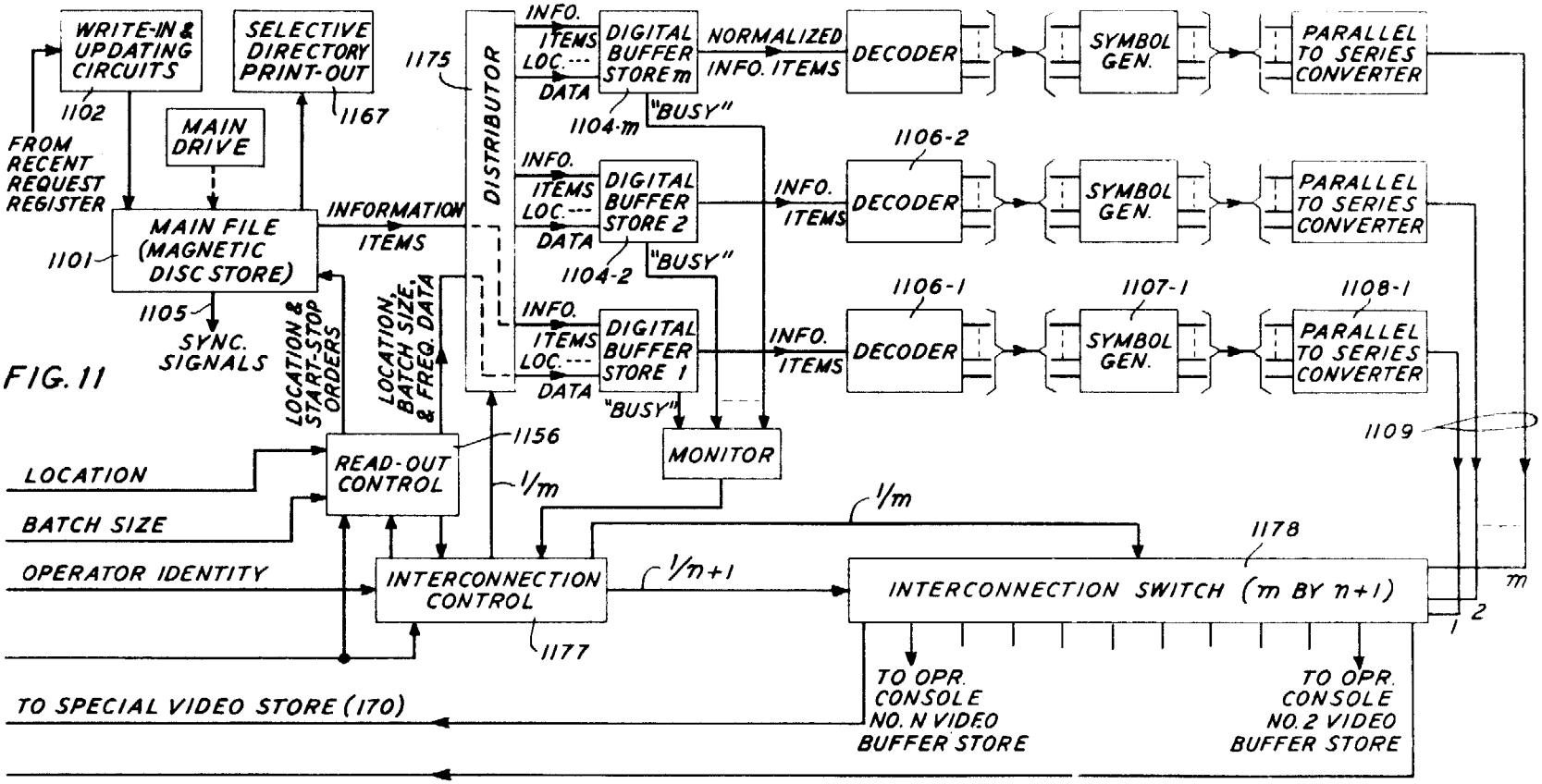
FIG. 11 is a block schematic diagram showing a modification of FIG. 2E and affording increased flexibility.

FIG. 11 shows apparatus, alternative to that of FIG. 1B, incorporating both of these refinements. The alphabetically or numerically consecutive items are to be understood as being spatially arranged in the main file 1101 in accordance with the foregoing interlace formula. The location specification and the start-and-stop orders are delivered, as before, by the read-out control unit 1156 whereupon the entire block of interlaced items is read out of the main file 1101 through a distributor 1175 and into an idle one of M digital buffer stores 1104. The idle condition is determined by a monitor 1176 on the basis of simple two-valued signals from the several buffer stores 1104. The designation of the idle one is passed through an interconnection control unit 1177 to establish a path through the distributor 1175 for the information item to one part of the digital buffer store 1104. At the same time, the location and batch-size orders are passed by the read-out control unit 1156 through the distributor 1175 into another part of the digital buffer store 1104.

Because the location designation includes, a specification of the zone of the main file discs in which the desired information block is recorded it contains within itself the information required by the buffer store 1104 to control the timing of its own shift register in such a way as to standardize the bit frequency and, simultaneously to "de-interlace" the items read out; i.e., to arrange them in alphabetical sequence on the time scale. Thereafter, control of the read-out from the shift register into the second stage of the buffer store adjusts the lengths of the gaps between the successive items to allow for eight successive horizontal scans of the beam of the viewing tube for each item.

After processing in the selected idle channel in the fashion described in connection with FIG. 1, the video signal, now in serial form, and arriving by way of one out of M conductors 1109, is passed by an interconnection switch 1178 to the video buffer store 214 assigned that one out of N different operators who initiated the request for it, or, if the read-out is destined for the emergency list, to the special video store 270. The correct path through this switch 1178 is selected by the interconnection control unit 1177 which receives, from the sequencing unit, the operator identiy designation and, from the monitor 1176, the designation of the idle channel which it then selects.

With this arrangement, M different and unrelated blocks of information successively read out of the main file can be converted to video signal form simultaneously.

Switching facilities such as the distributor 1175, the interconnection switch 1178, and the interconnection control unit 1177 are commonplace in dial-pulse-controlled telephone systems. They are described, for example, at pages 340 and 341 of "The Design of Switching Circuits" by W. Keister, A. E. Ritchie and S. H. Washburn (Van Norstand, 1951).

A number of refinements and extensions of the apparatus described above will suggest themselves to those skilled in the art. Thus, while fixed-length entries of fifty characters each and fixed-length encodings of the characters into six bits were chosen for simplicity and convenience in the foregoing description, it should be understood that other choices of encoding and entry length may be used advantageously within the spirit of this invention; for example, a more compact encoding of the characters might be in alphabetical encoding following the description of "Variable Length Binary Encodings" by E. N. Gilbert and E. F. Moore in The Bell System Technical Journal for July 1959, vol. 38, page 947. Implementation of this or other modifications will be straightforward for one skilled in the art.

For another example, in a large metropolis composed of individual boroughs such as New York City, it may be found desirable to provide an individual main file, or a part of one, together with its associated indices, access mechanisms, buffers, and the like for each such borough, and yet to require any individual operator to answer any inquiry as to the telephone number of a subscriber in any of these boroughs. To this end the operator's console may be provided, in addition to the set of alphanumeric keys of the code writer, with a smaller group of locality keys. Switching circuits of straightforward type can then make connections with the main file indices for the borough selected by the depression of any particular locality key, whereupon comparison, access-seeking, read-out and display take place as described above.

In the conduct of business many ituations, other than the telephone directory situation, present themselves in which numerically ordered information must be rapidly retrieved in response to requests originating with different individuals. The stock list of items carried by a supply house is an example. The apparatus of the invention operates without regard to the commercial meaning of the information items stored in the file and recovered from it, requiring only that it be amenable to coding and orderly arrangement.

What is claimed is:

1. In a system for storage and retrieval of information, a common machine-readable storage unit in which complete coded information items are stored in weighted order, [arranged in numerical order and at progressively different locations].

a coarse machine-readable index and a plurality of fine machine-readable indices, said coarse index containing selected coded partial items, each of a *smaller* [small] number of characters *than included in said complete item,* arranged in *weighted* [numerical] order, each [with an identification of] *identifying* one of said fine indices, each of said fine indices containing additional [a narrower selection of] coded partial items, each of a greater number of characters *than included in said selected partial items,* arranged in [numerical] *weighted* order, each [with an identification of] *identifying* the location in said common unit at which the most nearly similar complete item appears.

means, available in successive time *periods* [slots] of a repetitive cycle to a plurality of [independent] operators, each of whom may seek retrieval of a specified information item, for progressively comparing [the] *such as* specified item with [all] the partial items of [the] (1) coarse index to select two consecutive fine indices *the first of which is identified by the partial item which most nearly matches the specified item* and with [all the] (2) items of the selected fine indices to *specify* [identify] a location in said common unit *identified by the partial item of the fine indices which most nearly matches the specified item,* means responsive to a specification of said location for reading out of said common unit a block of *said* complete information items, and means for distributing each such block of information items to the operator seeking retrival of an item embraced within that block.

2. In combination with apparatus as defined in claim 1, display means individual to each operator, and means for actuating said display means [by] *to display* at least a portion of said block of information items.

3. In combination with apparatus as defined in claim 1, a cathode ray tube individual to each operator, and means for displaying on the screen of said tube at least a portion of said block of information items.

4. In combination with apparatus as defined in claim 1, a cathode ray tube individual to each operator, and having horizontal and vertical beam sweeping means and beam modulating means, common means for converting the coded block of information read out of the common unit into a video signal, and means for repetitively applying at least a portion of said video signal to said cathode ray tube, thereby to display said block portion on the screen of said tube.

5. In combination with apparatus as defined in claim 4, a video signal store, means for writing the video signal into said store, means for cyclically reading at least a portion of the stored video signal out of the store and for applying it to the beam-modulating means of the cathode ray tube, and means operative to synchronize said beam-sweeping means with said reading means.

6. Apparatus as defined in claim 5 wherein said video store comprises a rotary surface, a transducer of substantial width juxtaposed with said surface, and means for rotating said surface about its axis and for simultaneously translating said transducer in a direction perpendicular to the direction of movement of said surface, thereby to record said video signal in a spiral track of substantial width.

7. Apparatus as defined in claim 5 wherein said video store comprises a rotating surface having thereon a spiral track of several turns bearing the video signal counterpart of the information block read out of the common unit and wherein the means for cyclically reading out a portion of said stored video signal comprises a transduced juxtaposed with said surface, the width of said transducer being substantially less than the width of said spiral track, and means for activating said transducer throughout a first fraction of each revolution of said rotary video store during which it is juxtaposed with a single turn of said spiral track and for deactivating said transducer during a second fraction of each revolution of said store within which it is juxtaposed with two adjacent spiral tracks of said store.

8. In combination with apparatus as defined in claim 2, means manually operable by an operator while viewing display assigned to said operator for controllably selecting that portion of said information block so displayed.

9. In combination with apparatus as defined in claim 7, means for progressive altering the position of said read-out transducer, means for progressively altering the instants, within each single revolution of said store, at which said transducer is activated and deactivated, means for progressively altering the instant, within each revolution of said store, at which the vertical sweep of said cathode beam commences, and means for effecting all of said alterations in coordination, thus to cause those units of information displayed on the screen of said tube to progress through said information block.

10. In combination with apparatus as defined in claim 2, means for registering the location within said common unit at which the first item of said block of information items read out is stored, means for also registering the numerical position, within the information block, of a particular desired information item displayed, and means for combining said registrations to provide an exact specification of the location of said desired item within said common unit.

11. In combination with apparatus as defined in claim 1, a cathode ray tube individual to each operator, and having horizontal and vertical beam sweeping means and beam modulating means, means for displaying on the screen of said tube at least a portion of said block of information items, means for registering the location within said common unit at which the first item of said block of information items read out is stored, a photo-sensitive stylus, means responsive to the passage of said beam past a point of said screen momentarily touched by said stylus for registering the time within a single vertical sweep period of said beam at which said passage occurs, and means for combining said time registration with said location registration to provide an exact specification of the location of said desired item within said common unit.

12. In combination with apparatus as defined in claim 10, means for writing into said common unit, and in a location coordinated with said exactly specified location, an indication that the information item there stored has just been indicated as a particular desired one.

13. In combination with apparatus as defined in claim 10, means for comparing information items identified by all operators of said plurality as being requested within a preassigned period, and means responsive to excessive frequency of requests for a particular item for reading said particular item out of said common unit and for writing it into a special buffer store, there to constitute a single item of a special emergency list, and means for continuously presenting all items of said emergency list on the display means assigned to all operators not engaged in interrogating the common storage unit.

14. In a system for storage and retrieval of information, a machine-readable storage unit in which coded complete information items are arranged in numerical order and at progressively different locations, a machine-readable index in which selected coded partial items are arranged in numerical order, each with an indication of the location at which the most nearly similar complete item appears in said storage unit, means, for consecutively registering the characters that specify an information item to be retrieved, whereby the specification of said item is progressively increased in precision, character by character, means, operative each time a new character is registered, for sequentially comparing the partially specified registered item with all of the partial items of said index, means for counting the number of numerical equalities encountered in the course of said comparison, and means, operative when the number of equalities counted is not more than one, for identifying the location designation of the indexed partial item that most nearly resembles the registered partial item.

15. In combination with apparatus as defined in claim 14, a source of an auxiliary signal, and means responsive to the signal of said source and operative when the number of equalities counted is two or more for identifying the location designation of the first one of the equality-producing partial items.

16. In combination with apparatus as defined in claim 14, means for extracting from said storage unit a set of blocks of information items commencing with the block immediately preceding the item identified.

17. In combination with apparatus as defined in claim 14, means for extracting from said storage unit a set of blocks of information items commencing with the block immediately preceding the item identified, the number of blocks in said set being in approximate proportion to the number of equalities counted.

18. Apparatus as defined in claim 17 wherein said counting means is proportioned to deliver a signal representative of one of the numbers 1, 2, 3 . . . N+1, according as the equalities counted are zero, one, two, . . . N, and wherein said extracting means is proportioned to extract a number of blocks of information items equal to said number.

19. Apparatus as defined in claim 14 wherein said character registering means is initially filled with the code counterparts of a universal symbol and wherein each registration operation replaces one such universal symbol by the code counterpart of the alphanumeric character thus registered, leaving the code counterparts of the remaining universal symbols unaltered, and wherein said comparing means is proportioned to make a new comparison, each time a new character is registered, of all the characters of the partially specified registered word with the corresponding characters of the item of said index in disregard of those characters of the index item having positions of precedence lower than the precedence position of the last character registered.

20. In a system for storage and retrieval of information, a common machine-readable storage unit in which coded complete information items are arranged in numerical order and at progressively different locations, a common machine-readable index in which selected coded partial items are arranged in numerical order, each with an indication of the location at which the most nearly similar complete item appears in said common unit, means, individual to each of a plurality of independent operators, for consecutively registering the characters that specify an information item to be retrieved, whereby the specification of said item is increased in precision, character by character, a word comporator, time-assignment means for partially providing the several operators of said plurality with access to said comparator in the successive time slots of each of a sequence of cycles, means operative in the time-assignment cycle following each new character registration by a specified operator and in the time slot assigned to said operator for completing the provision of said operator's access to said comparator when not engaged, means for causing said comparator thereupon to successively compare the partially specified item as registered by said operator with the items of said index, means for determining the number of equalities encountered in the course of said comparison, means, operative when the number of equalities is determined to be two or more, for releasing said comparator for access of another operator of said plurality, and means, operative when the number of equalities encountered is determined to be not more than one, for reading out of said index the location, in the common storage unit, of the item that most nearly resembles the registered partial item.

21. In combination with apparatus as defined in claim 20, means operative each time a decision is reached as to the number of equalities encountered between registered partial word and index word for registering the outcome of said decision without disturbing the character registration while clearing the counting means, whereby, after the registration of additional characters by a specified operator and upon the next recurrence of the time slot assigned to that operator, comparison of the entire registered word with the index words is resumed without delay, and repetition of earlier comparisons is avoided.

22. In a system for storage and retrieval of information, a machine-readable storage unit of large capacity in which complete information items are arranged in systematic order at progressively different locations, a rotary machine-readable index of the contents of said unit in which selected partial information items are arranged in systematic order, each of said partial items being accompanied by a designation of the location at which the corresponding complete item is stored in the large capacity unit, a cathode ray tube having beam sweeping means, beam modulating means and a viewing screen, means including said sweeping means for causing the cathode beam of said tube to explore its screen in synchronism with the rotation of said index, each vertical sweep comprising a plurality of consecutive horizontal sweeps and taking place in a single index revolution, means including said modulating means for cyclically presenting said index on said screen in the course of successive vertical sweeps, means for counting the consecutive horizontal sweeps within each of said vertical sweeps, means for registering the number of horizontal sweeps counted at the instant at which said beam passes a point of said screen at which a particular partial item of said index is presented, means for translating said registered count into a location specification, means for reading out of said large capacity unit a block of complete items commencing with the item whose location is thus specified, means for maintaining synchronism between said readout and the beam-deflecting means of said tube, and means for presenting at least a selected portion of said block of items on the screen of said tube.

23. In a system for storage and retrieval of information, a rotary storage unit of large capacity in which complete information items are arranged in systematic order at progressively different location, a plurality of rotary fine indices of the contents of said unit in each of which selected partial information items are arranged in systematic order, each of said partial items being accompanied by a designation of the location at which the corresponding complete item is stored in the large capacity unit, a coarse rotary index of said fine indices in which selected partial information items, one from each fine index, are arranged in systematic order, each accompanied by a designation of the location of the fine index in which it appears, means for revolving said unit and said indices in mutual synchronism, a cathode ray tube having beam sweeping means, beam modulating means and a viewing screen, means including said sweeping means for causing the cathode beam of said tube to explore its screen in synchronism with the rotation of said indices, each vertical sweep comprising a plurality of consecutive horizontal sweeps and taking place in a single index revolution, means including said modulating means for cyclically presenting a selected one of said indices on said screen in the course of successive vertical sweeps, means for counting the consecutive horizontal sweeps and fractions of sweeps within each of said vertical scans, means for registering the number of horizontal sweeps and sweep fractions counted at the instant at which said beam passes a point of said screen at which a particular partial item of said selected index is presented, said registered count constituting a location specification, and means for presenting items stored at said specified location on said screen.

24. Telephone information bureau apparatus which comprises a first machine-readable storage unit in which are stored information items, each constituted of a name component, an address component and a telephone number component, said items being disposed at progressively different locations and arranged in alphabetical order of name components, a machine-readable name index for obtaining access to said unit at a specified location in response to a name specification, means including said name index for reading a first unbroken string of said information items out of said unit in response to a partial specification of a name, a second machine-readable storage unit in which the same information items are stored, disposed at progressively different locations and arranged in numerical order of address components, a machine-readable address index for obtaining access to said second unit at a specified location in response to an address specification, means including said address index for reading a second unbroken string of said information items out of said second units in response to a partial specification of an address, means for comparing each telephone number component of said first item string with all telephone number components of said second string, and means for indicating only those information items of which identical telephone number components are common to said first and second strings.

25. In combination with a machine-readable storage unit in which are stored information items, each constituted of at least a name component of a sequence of characters, said items being disposed at progressively different locations and arranged in alphabetical order of name components, means for generating an index of the stored contents of said unit which comprises means for reading out of said unit the item stored at every $N^{th}$ location, an index medium for the storage of information in machine-readable form, means for storing the name component of each item thus read out, character by character, in said medium, means for simultaneously comparing, character by character, the name component of each item thus read out with the name components of its predecessor and of its successor, means for terminating said storage upon the determination, by said comparing means, that the name component thus stored differs by one character both from its predecessor and from its successor, and means for storing, in said medium and adjacent to said terminated name component, the location in said unit in which the entire information item appears.

*26. A data storage and retrieval system comprising*

*a storage unit storing data,*

*a plurality of operator consoles each including means for generating data requests, a variable number of data request characters defining said data requests, and means for receiving and displaying responses thereto,*

*access means, available to each of said consoles in successive time periods of a repetitive cycle, for receiving and processing said data request characters including means for determining according to a predetermined strategy when the number of said variable request characters being received is sufficient to cause the retrieval of the requested data stored in said storage unit and means for determining the location in said storage unit of a block of data containing said specified data, said number being a variable number depending upon the particular request characters generated,*

*means responsive to said access determining means, when a sufficient number of request characters has been received from a said console, for retrieving said block of data from said storage unit, and*

*means for transmitting said block of data to a said one of said consoles in response to the generated request characters from that console specifying said data.*

*27. A combination as in claim 26 further comprising means responsive to said access determining means, when either a sufficient or an insufficient number of said request characters from a said console has been received to retrieve said desired data, for causing the release of said access means by a said console after a time period to permit access thereto by another one of said operator consoles.*

*28. A combination as in claim 27 further comprising means, responding to the access means determining that an insufficient number of said request characters has been received from a said console to cause retrieval, for preventing such retrieval unit such time as the console which generated said request characters regains access to said access means and generates additional request characters, the processing of said additional request characters being done so as to avoid the repetition of the processing of said earlier received request characters.*

*29. In combination in a system for storage and retrieval of data,*

*a common machine readable storage unit storing data,*

*a plurality of display units each comprising*

*(a) means for generating data request characters, and*

*(b) means for receiving and displaying stored data in reply to said request characters,*

*data retrieval and access means connected to said storage unit and responsive to said request characters for retrieving requested data from said storage unit, and*

*first and second time-assignment means inter-connecting said retrieval and access means with each of said display units for providing the several display units with access to said retrieval and access means in successive time periods of each of a sequence of cycles,*

*said first means including means for transmitting during a said period the request characters which shall have been generated by a said display unit to said retrieval and access means and including means for thereafter providing another of said display units with access to said retrieval and access means during a subsequent period,*

*said second means including means for transmitting said retrieved data to a said display unit from which the request characters for such data were generated, and*

*said first and second time-assignment means each providing access independently of the other.*

*30. A combination as in claim 29 wherein said retrieval and access means comprises,*

*means operative in the time-assignment cycles of said first time-assignment means and in response to request characters from one of said display units for processing said request characters,*

*means for storing the results obtained by said processing means,*

*means for releasing said retrieval and access means from a said display unit for access by another of said display units in response to a determination by said processing means that said request characters are insufficient according to a predetermined strategy to retrieve the desired data, and*

*means for restoring said access to said one display unit after additional request characters have been generated by said one display unit upon the next recurrence of the time period assigned to said one display unit, continuing said processing without repeating said earlier processing for said one display unit.*

*31. In combination in a system for storage and retrieval of information,*

*a common machine-readable storage unit for storing information,*

*means individual to each of a plurality of independent operators for consecutively generating and registering data requests each of which include a variable number of characters that specify information items to be retrieved,*

*retrieving means for retrieving from said storage unit a block of information items containing that item specified by said characters,*

*first and second time-assignment means each providing the several operators of said plurality with access to said retrieving means in the successive time periods of each of a sequence of cycles,*

*said first means including means for enabling the transfer of said registered characters from said registering means to said retrieving means and including means for, thereafter enabling another operator to gain access to said retrieving means,*

*said second means including means for enabling the distribution of said retrieval block of information items from said retrieving means to the operator having registered the characters specifying an item embraced within that block, and*

*said first and second means each providing said access independently of the other.*

*32. A combination as in claim 31 wherein said retrieving means comprises*

*decision means for automatically initiating the retrieval of an information item when, according to a predetermined logical strategy, a sufficient number of characters for specifying said item has been received by said retrieving means, said sufficient number being a variable number depending on the particular request generated, and*

*means for indicating the location in said storage unit of a block of information items containing said specified item.*

References Cited

The following references, cited by the Examiner, are of record in the patented file of this patent or the original patent.

UNITED STATES PATENTS

| | | | |
|---|---|---|---|
| 2,967,296 | 1/1961 | Chien et al. | 340—172.5 |
| 3,037,192 | 5/1962 | Everett | 340—172.5 |
| 3,056,111 | 9/1962 | Finkler et al. | 340—172.5 |
| 3,066,280 | 11/1962 | Perry | 340—172.5 |
| 3,149,309 | 9/1964 | Schmidt | 340—172.5 |
| 3,197,621 | 7/1965 | Urquhart | 340—172.5 |
| 3,281,788 | 10/1966 | Hernan et al. | 340—172.5 |
| 3,212,062 | 10/1965 | Goldman et al. | 340—172.5 |
| 3,241,120 | 3/1966 | Amdahl | 340—172.5 |
| 3,245,045 | 4/1966 | Randlev | 340—172.5 |
| 3,248,705 | 4/1966 | Dammann et al. | 340—172.5 |
| 3,335,411 | 8/1967 | Sinn | 340—172.5 |

PAUL J. HENON, Primary Examiner

H. E. SPRINGBORN, Assistant Examiner